United States Patent
Lee et al.

(10) Patent No.: US 12,271,605 B2
(45) Date of Patent: Apr. 8, 2025

(54) STORAGE DEVICE AND OPERATION METHOD THEREOF

(71) Applicant: SAMSUNG ELECTRONICS CO., LTD., Suwon-si (KR)

(72) Inventors: Ranhee Lee, Suwon-si (KR); Byungchul Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 17/944,613

(22) Filed: Sep. 14, 2022

(65) Prior Publication Data

US 2023/0152988 A1    May 18, 2023

(30) Foreign Application Priority Data

Nov. 15, 2021 (KR) .................... 10-2021-0156966
Apr. 21, 2022 (KR) .................... 10-2022-0049635

(51) Int. Cl.
*G06F 21/79* (2013.01)
*G06F 3/06* (2006.01)

(52) U.S. Cl.
CPC .......... *G06F 3/0622* (2013.01); *G06F 3/0607* (2013.01); *G06F 3/0656* (2013.01); *G06F 21/79* (2013.01); *G06F 3/0679* (2013.01); *G06F 2221/2113* (2013.01)

(58) Field of Classification Search
CPC ........ G06F 21/52; G06F 21/566; G06F 21/79; G06F 21/602; G06F 21/6218; G06F 2221/2113
See application file for complete search history.

(56) References Cited

U.S. PATENT DOCUMENTS

| | | |
|---|---|---|
| 9,563,382 B2 | 2/2017 | Hahn et al. |
| 10,108,371 B2 | 10/2018 | Nimmagadda et al. |
| 10,658,300 B2 | 5/2020 | Kim et al. |
| 10,782,915 B2 | 9/2020 | Kim et al. |
| 10,956,323 B2 | 3/2021 | Juenemann et al. |
| 10,983,722 B2 | 4/2021 | Kim et al. |
| 11,016,846 B2 | 5/2021 | Eom et al. |
| 11,036,640 B2 | 6/2021 | Lee et al. |
| 11,281,549 B2 | 3/2022 | Kim et al. |
| 2012/0324222 A1* | 12/2012 | Massey ............. H04L 69/12 713/166 |
| 2013/0047250 A1* | 2/2013 | Kothari ............. G06F 1/32 726/16 |
| 2014/0115241 A1* | 4/2014 | Wei ............. G06F 12/0246 711/103 |

(Continued)

FOREIGN PATENT DOCUMENTS

| | | |
|---|---|---|
| KR | 10-1580548 B1 | 12/2015 |
| KR | 10-1648262 B1 | 8/2016 |

(Continued)

*Primary Examiner* — Eric W Shepperd
(74) *Attorney, Agent, or Firm* — Muir Patent Law, PLLC

(57) ABSTRACT

A storage device and an operation method of a storage device is provided. An operation method of a storage device includes: detecting an abnormal operation of a host memory buffer (HMB) positioned outside a storage device during data processing; and when the abnormal operation is detected, updating, by the storage device, a security policy applied when writing data to or reading data from the HMB.

11 Claims, 20 Drawing Sheets

(56) References Cited

U.S. PATENT DOCUMENTS

| | | | |
|---|---|---|---|
| 2016/0147672 A1* | 5/2016 | Atzmon | G06F 12/1441 |
| | | | 711/163 |
| 2017/0053711 A1* | 2/2017 | Shibata | G11C 29/56012 |
| 2017/0060668 A1* | 3/2017 | Farhan | G06F 12/0871 |
| 2018/0039541 A1* | 2/2018 | Hahn | G06F 3/065 |
| 2018/0067684 A1* | 3/2018 | Benisty | G11C 29/52 |
| 2018/0069658 A1* | 3/2018 | Benisty | H03M 13/15 |
| 2018/0107417 A1* | 4/2018 | Shechter | G06F 3/0619 |
| 2018/0260151 A1* | 9/2018 | Hsu | G06F 21/6218 |
| 2019/0114220 A1* | 4/2019 | Stenfort | G11C 29/52 |
| 2019/0123894 A1* | 4/2019 | Yuan | H04L 9/0819 |
| 2019/0138220 A1* | 5/2019 | Hahn | G06F 3/0611 |
| 2019/0146709 A1* | 5/2019 | Im | G06F 3/0685 |
| | | | 711/103 |
| 2019/0286351 A1* | 9/2019 | Ho | G06F 3/0656 |
| 2019/0325547 A1* | 10/2019 | Yoggi | G06Q 50/60 |
| 2019/0362081 A1* | 11/2019 | Kanno | G06F 21/602 |
| 2020/0012595 A1* | 1/2020 | Bordia | G06F 3/0673 |
| 2020/0110677 A1* | 4/2020 | Kim | G06F 12/0868 |
| 2020/0151040 A1* | 5/2020 | Lee | G06F 3/0673 |
| 2020/0151055 A1* | 5/2020 | Eom | G06F 13/28 |
| 2020/0225883 A1 | 7/2020 | Bhimani et al. | |
| 2020/0293676 A1 | 9/2020 | Hara | |
| 2020/0334159 A1* | 10/2020 | Lee | G06F 3/0659 |
| 2021/0073404 A1* | 3/2021 | Sakata | G06F 3/0623 |
| 2021/0152190 A1* | 5/2021 | Dodds | H04L 9/12 |
| 2021/0334200 A1* | 10/2021 | Xu | G06F 13/4221 |
| 2021/0390179 A1* | 12/2021 | Hahn | G06F 21/71 |
| 2022/0334920 A1* | 10/2022 | Ho | G06F 11/0727 |
| 2022/0358016 A1* | 11/2022 | Park | G06F 11/1415 |
| 2023/0153027 A1* | 5/2023 | Hahn | G06F 3/061 |
| | | | 711/154 |

FOREIGN PATENT DOCUMENTS

| | | |
|---|---|---|
| KR | 10-2018-0054394 A | 5/2018 |
| KR | 10-2019-0057779 A | 5/2019 |
| KR | 10-2019-0087897 A | 7/2019 |
| KR | 10-2020-0038723 A | 4/2020 |
| KR | 10-2020-0054402 | 5/2020 |

\* cited by examiner

FIG. 3

HMBAT

| 3010 | 3020 | 3030 | 3040 |
|------|------|------|------|
| PA 0 | LA 0 | 1 | 0 |
| PA 1 | LA 1 | 1 | 1 |
| ... | | | |
| PA N | LA N | 1 | N |

FIG. 4A

HMBMT

| 3110 | 3120 | 3130 |
|---|---|---|
| 0 | IP #1 | 010011010... (128b Key) |
| 1 | IP #0 | 110110000101001100... (256b Key) |
| ... | | |
| N | IP #2 | 110011011...(128b Key) |

FIG. 4B

HMBMT

| 3110 | 3120 | 3130 |
|---|---|---|
| 0 | IP #1 | 010011010... (128b Key) |
| 1 | IP #0 | 000110100010111111... (256b Key) |
| ... | | |
| N | IP #2 | 110011011...(128b Key) |

FIG. 4C

HMBMT

| 3110 | 3120 | 3130 |
|---|---|---|
| 0 | IP #0 | 11011001101001100... (256b Key) |
| 1 | IP #0 | 00011010001011111... (256b Key) |
| ... | | |
| N | IP #2 | 110011011...(128b Key) |

FIG. 4D

HMBMT

| 3110 | 3120 | 3130 |
|---|---|---|
| 0 | IP #0 | 11011001101001100... (256b Key) |
| 1 | IP #0 | 00011010001011111... (256b Key) |
| ... | | |
| N | IP #1 | 110011011...(128b Key) |

STORAGE DEVICE AND OPERATION METHOD THEREOF

CROSS-REFERENCE TO RELATED APPLICATIONS

This application claims priority to and the benefit of Korean Patent Application No. 10-2021-0156966 filed in the Korean Intellectual Property Office on Nov. 15, 2021, and Korean Patent Application No. 10-2022-0049635 filed in the Korean Intellectual Property Office on Apr. 21, 2022, the entire contents of which are incorporated herein by reference.

BACKGROUND

1. Field

Embodiments relate to a storage device and an operation method thereof.

2. Description of the Related Art

A semiconductor memory may be classified into a volatile memory device, in which stored data is destroyed when power is not supplied, such as a static random access memory (SRAM) and a dynamic RAM (DRAM), and a nonvolatile memory device that retains stored data even when power is not supplied, such as a flash memory device, a phase-change RAM (PRAM), a magnetic RAM (MRAM), a resistive RAM (RRAM), and a ferroelectric RAM (FRAM).

SUMMARY

An embodiment is directed to a method of operating a storage device, including: detecting an abnormal operation of a host memory buffer (HMB) positioned outside the storage device during data processing; and when the abnormal operation is detected, updating, by the storage device, a security policy applied when writing data to or reading data from the HMB.

An embodiment is directed to a method of operating a storage device, including: dividing a host memory buffer (HMB) positioned outside the storage device into a plurality of regions; determining a security level of the plurality of regions; and matching a security policy corresponding to the security level determined with respect to the plurality of regions to each of the plurality of regions.

An embodiment is directed to a storage device, including: a memory device; and a controller configured to store information related to the memory device in a host memory buffer (HMB) positioned outside the storage device and to manage the HMB. The controller may include: an abnormality detector configured to detect an abnormal operation of the HMB during data processing, and an HMB manager configured to update a security policy applied when writing data to or reading data from the HMB when the abnormal operation is detected.

BRIEF DESCRIPTION OF THE DRAWINGS

Features will become apparent to those of skill in the art by describing in detail example embodiments with reference to the attached drawings in which:

FIG. 3 illustrates an example of an HMB allocation table (HMBAT) generated by an HMB manager of FIG. 2.

FIGS. 4A to 4D illustrate examples of an HMB mapping table (HMBMT) generated by an HMB manager.

DETAILED DESCRIPTION

Figure 1:
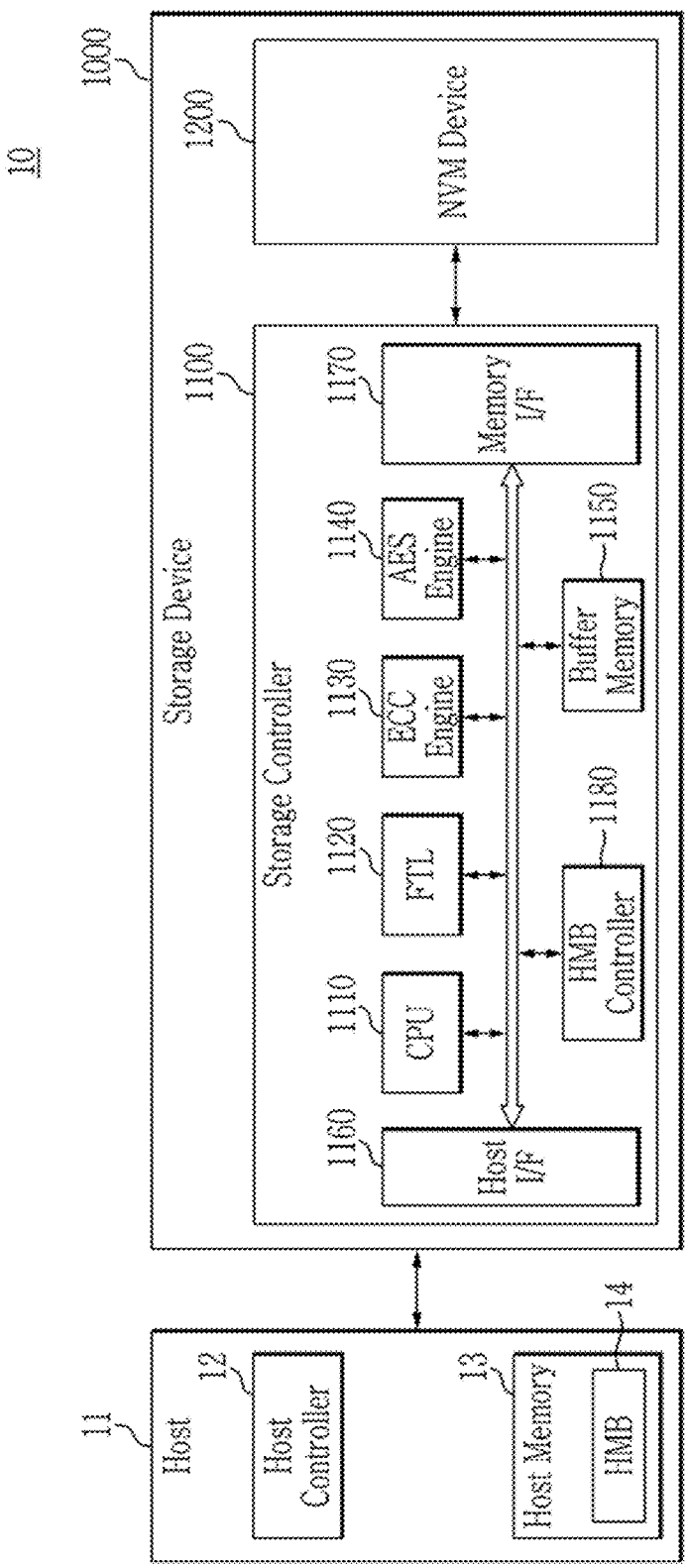
FIG. 1 illustrates a block diagram of a storage system according to an example embodiment.

FIG. 1 illustrates a block diagram of a storage system according to an example embodiment.

Referring to FIG. 1, a storage system 10 may include a host 11 and a storage device 1000. In an example embodiment, the storage system 10 may be one of information processing devices configured to process various information and store the processed information, such as personal computers, laptops, servers, workstations, smartphones, tablet PCs, digital cameras, black boxes, and the like.

The host 11 may control overall operations of the storage system 10. For example, the host 11 may transmit a request to store data in the storage device 1000, or read data stored in the storage device 1000, to the storage device 1000. In an example embodiment, the host 11 may be a processor core such as a central processing unit (CPU) or an application processor (AP) configured to control the storage system 10, or a computing node connected through a network.

In an example embodiment, the host 11 may include a host controller 12 and a host memory 13. The host controller 12 may be a device configured to control general operations of the host 11 or to control the storage device 1000 from the host 11 side. The host memory 13 may be a buffer memory, a cache memory, or an operation memory used in the host 11. The host memory 13 may be loaded with an application program, a file system, a device driver, and the like. The host memory 13 may be loaded with various software or data executed by the host 11.

In an example embodiment, the host memory 13 may include a host memory buffer (HMB) 14. The HMB 14 may be a partial region of the host memory 13 that is allocated as a buffer of the storage device 1000.

In an example embodiment, the HMB 14 may be managed by the storage device 1000. Data of the storage device 1000 may be stored in the HMB 14. For example, metadata or a mapping table of the storage device 1000 may be stored in the HMB 14. The mapping table may include mapping information between a logical address from the host 11 and a physical address of the storage device 1000.

The storage device 1000 may operate under control of the host 11. The storage device 1000 may include a storage controller 1100 and a nonvolatile memory device 1200. The storage controller 1100 may store data in the nonvolatile memory device 1200, or read data stored in the nonvolatile memory device 1200, under the control of the host 11. In an example embodiment, the storage controller 1100 may perform various management operations for efficiently using the nonvolatile memory device 1200.

The storage controller 1100 may include a central processing unit (CPU) 1110, a flash translation layer (FTL) 1120, an error correction code (ECC) engine 1130, an advanced encryption standard (AES) engine 1140, a buffer memory 1150, a host interface circuit 1160, a memory interface circuit 1170, and an HMB controller 1180.

The CPU 1110 may control overall operations of the storage controller 1100. The FTL 1120 may perform various operations for efficiently using the nonvolatile memory device 1200. For example, the host 11 may manage a storage space of the storage device 1000 by a logical address. The FTL 1120 may be configured to manage address mapping between the logical address from the host 11 and the physical address of the storage device 1000. The FTL 1120 may perform a wear leveling operation to prevent excessive degradation of a specific memory block among memory blocks of the nonvolatile memory device 1200. A lifespan of the nonvolatile memory device 1200 may be improved by the wear leveling operation of the FTL 1120. The FTL 1120 may perform garbage collection on the nonvolatile memory device 1200 to secure a free memory block.

The ECC engine 1130 may perform error detection and error correction on data read from the nonvolatile memory device 1200. For example, the ECC engine 1130 may generate an error correction code (or a parity bit) for data to be written into the nonvolatile memory device 1200. The generated error correction code (or parity bit) may be stored in the nonvolatile memory device 1200 together with data to be written. Thereafter, when data written from the nonvolatile memory device 1200 is read, the ECC engine 1130 may detect and correct an error in the read data based on the read data and a corresponding error correction code (or a corresponding parity bit).

The AES engine 1140 may perform an encryption operation or a decryption operation on data received from the host 11 or the nonvolatile memory device 1200. In an example embodiment, the encryption operation or the decryption operation may be performed based on a symmetric-key algorithm.

In an example embodiment, at least one of the FTL 1120, the ECC engine 1130, or the AES engine 1140 may be implemented by software or hardware. When at least one of the FTL 1120, the ECC engine 1130, or the AES engine 1140 is implemented by software, a program code, or information may be stored in the buffer memory 1150, and may be executed by the CPU 1110. When at least one of the FTL 1120, the ECC engine 1130, or the AES engine 1140 is implemented by hardware, a hardware accelerator configured to perform an operation of at least one of the FTL 1120, the ECC engine 1130, or AES engine 1140, may be separately provided from the CPU 1110.

The buffer memory 1150 may be a write buffer or a read buffer configured to temporarily store data inputted to the storage controller 1100. The buffer memory 1150 may be configured to store various information used for the storage controller 1100 to operate. For example, the buffer memory 1150 may store a mapping table managed by the FTL 1120. In an implementation, the buffer memory 1150 may store software, firmware, or information related to the FTL 1120. For example, the buffer memory 1150 may store an HMB allocation table (HMBAT), an HMB state table (HMBST), an HMB mapping table (HMBMT), and the like. The buffer memory 1150 may store metadata for memory blocks.

In an example embodiment, the buffer memory 1150 may be an SRAM, but the buffer memory 1150 may be implemented with various types of memory devices such as a DRAM, an MRAM, a PRAM, and the like. The buffer memory 1150 is illustrated in FIG. 1 as being included in the storage controller 1100, but the buffer memory 1150 may be positioned outside the storage controller 1100, and the storage controller 1100 may communicate with a buffer memory through a separate communication channel or an interface.

The host interface circuit 1160 may be configured to communicate with the host 11 according to a predetermined interface protocol. In an example embodiment, the predetermined interface protocol may include at least one of various interface protocols such as an advanced technology attachment (ATA) interface, a serial ATA (SATA) interface, an external SATA (e-SATA) interface, a small computer small interface (SCSI) interface, a serial attached SCSI (SAS) interface, a peripheral component interconnection (PCI) interface, a PCI express (PCIe) interface, a nonvolatile memory express (NVMe) interface, an Institute of Electrical and Electronics Engineers (IEEE) 1394, a universal serial bus (USB) interface, a secure digital (SD) card, a multi-media card (MMC) interface, an embedded multimedia card (eMMC) interface, a universal flash storage (UFS) interface, an embedded universal flash storage (eUFS) interface, a compact flash (CF) card interface, and a network interface. The host interface circuit 1160 may receive a signal based on a predetermined interface protocol from the host 11, and may operate based on the received signal. In an implementation, the host interface circuit 1160 may transmit a signal based on a predetermined interface protocol to the host 11.

The memory interface circuit 1170 may be configured to communicate with the nonvolatile memory device 1200 according to a predetermined interface protocol. In an example embodiment, the predetermined interface protocol may include at least one of various interface protocols such as a toggle interface and an open NAND flash interface (ONFI) interface. In an example embodiment, the memory interface circuit 1170 may communicate with the nonvolatile memory device 1200 based on a toggle interface. In this case, the memory interface circuit 1170 may communicate with the nonvolatile memory device 1200 through a plurality of channels. In an example embodiment, each of the plurality of channels may include a plurality of signal lines configured to transmit various control signals, data signals, and data strobe signals.

The HMB controller 1180 may manage the HMB 14. The HMB controller 1180 may store and manage various data by using the HMB 14 as a buffer. The HMB controller 1180 may perform an encoding operation on data based on a security policy for reliability or security of data, and may store the encoded data in the HMB 14. The HMB controller 1180 may read the encoded data from the HMB 14, and may perform a decoding operation on the corresponding data.

In an example embodiment, the HMB controller 1180 may divide and manage the HMB 14 into a plurality of regions based on HMB allocation information provided from the host 11. The HMB controller 1180 may select a security policy with respect to each of the plurality of regions. For example, the HMB controller 1180 may set the same security policy or different security policies with respect to the plurality of regions. The HMB controller 1180 may select security policies for each of the plurality of regions based on characteristics and various information of the plurality of regions.

In an example embodiment, the HMB controller 1180 may set a security policy with respect to each region of the HMB 14 based on at least one of a reliability level or a security level for each region of the HMB 14. For example, the HMB controller 1180 may set a security policy based on a type of data to be stored in a specific region. The HMB controller 1180 may set a security policy based on reliability or security of data required for a specific region. The HMB controller 1180 may set a security policy based on a characteristic of a memory device corresponding to a specific region. For example, the security policy may relate to a technology for encrypting or decrypting data in order to provide information protection or security for a user. In addition, the security policy may include a policy for writing data to or reading data from the HMB 14 by using a security intellectual property (IP) or key. The security IP may include an integrated circuit (IC) designed to use a security algorithm.

In an example embodiment, the HMB controller 1180 may change the corresponding security policy when a change condition for each of the plurality of regions is satisfied. For example, the HMB controller 1180 may change the security policy for a specific region during operation (e.g., during runtime). The HMB controller 1180 may determine that the change condition of the security policy is met, e.g., may decide to change the security policy, when a characteristic of a memory device corresponding to a specific region is changed, when a type of data to be stored in a specific region is changed, when a reliability requirement level for a specific region is changed, when a security requirement level for a specific region is changed, when a key validity time has elapsed, when a data integrity check fails, or when an abnormal memory buffer allocation is detected.

The storage device 1000 according to the present example embodiment may select an appropriate security policy with respect to each region of the HMB 14. For example, the storage device 1000 may set a high-security policy for a region having a high data reliability requirement, and may set a low-security policy for a region having a low data reliability requirement.

By comparison, when a same security policy can only be set for an entire host memory buffer (HMB) (i.e., when an appropriate security policy is not respectively set with respect to each region of the HMB), a security policy having high security that is only needed for some data stored in the HMB may be nevertheless be used for all data stored in the HMB. As a result, the complex processing operations associated with the high-security policy may be performed for all data stored in the HMB, resulting in overhead increases or latency increases, degrading device performance.

On the other hand, an example embodiment of the storage device 1000 as described above may select an appropriate security policy with respect to each region of the HMB 14, and may also change the security policy corresponding to the region of the HMB 14 when a change condition is satisfied. Accordingly, the storage device 1000 may have improved performance and improved reliability.

An operation method of the host 11 and the storage device 1000 according to the embodiment of the present disclosure will be now described in more detail.

Figure 2:
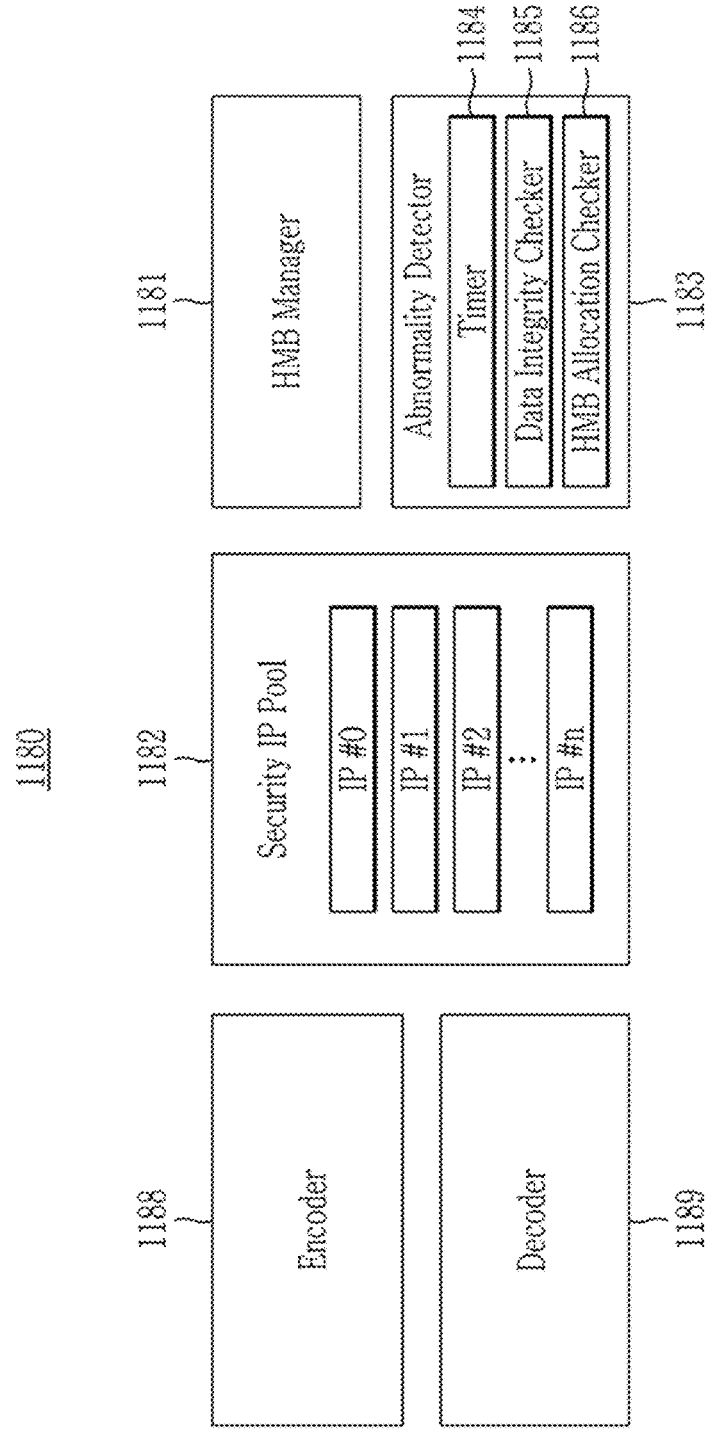
FIG. 2 illustrates a block diagram of a host memory buffer (HMB) controller of FIG. 1 in more detail.

FIG. 2 illustrates a block diagram of an HMB controller of FIG. 1 in more detail. FIG. 3 illustrates an example of an HMB allocation table (HMBAT) generated by an HMB manager of FIG. 2. FIG. 4A to FIG. 4D illustrate examples of an HMB allocation table (HMBAT) generated by an HMB manager.

Referring to FIGS. 1 to 3, and FIG. 4A to FIG. 4D, the storage device 1000 may use a resource of the host 11. For example, the storage device 1000 may manage various data by using the HMB 14 as a buffer. Accordingly, sufficient resources may be provided for the storage device 1000.

The HMB controller 1180 may include an HMB manager 1181, a security IP pool 1182, an abnormality detector 1183, an encoder 1188, and a decoder 1189.

The HMB manager 1181 may control overall operations of the HMB controller 1180. For example, the HMB manager 1181 may receive HMB allocation information from the host 11, and may divide the HMB 14 into a plurality of regions based on the HMB allocation information.

Referring to FIG. 3, the HMB manager 1181 may generate and store an HMB allocation table (HMBAT) including a physical address 3010, a logical address 3020, a mapping state 3030, tag information 3040, etc., of the plurality of regions of the HMB 14.

The physical address 3010 may indicate an actual address of each region of the HMB 14 divided by the HMB manager 1181.

The logical address 3020 may be a logical entry set by the HMB manager 1181 to manage regions of the HMB 14. The logical address 3020 may correspond to the physical address 3010.

The mapping state 3030 may indicate whether the physical address 3010 and the logical address 3020 are mapped. For example, a case of mapping may be indicated as '1', and a case of not mapping may be indicated as '0'.

The tag information 3040 may indicate an identifier of the regions of the HMB 14. For example, the HMB manager 1181 may divide the HMB 14 into region 0, region 1, . . . , region N (wherein N is a natural number), and the tag information 3040 may include '0', '1', . . . , 'N' as values for identifying the corresponding regions.

The HMB manager 1181 may set a security policy with respect to each of the plurality of regions. For example, the HMB manager 1181 may set a security IP or key for each of the plurality of regions, and may generate and store the HMB mapping table (HMBMT).

The HMB mapping table (HMBMT) may include tag information 3110, a security IP 3120, and a key 3130 of the region of the HMB 14.

The HMB manager 1181 may change the security policy of a specific region when a change condition is satisfied. For example, when an abnormal operation of the HMB 14 is detected, the HMB manager 1181 may change at least one of a security IP or a key. Changing the security IP may change a key value generation method. Changing the key may mean changing a key value of a corresponding region in the key mapping table. The HMB manager 1181 may reflect the changed security policy to the HMB mapping table (HMBMT).

Referring to FIG. 4A, the HMB manager 1181 may set a security IP (IP #1) in region 0 of the HMB 14, and may set a 128-bit key (e.g., '010011010 . . . '). The HMB manager 1181 may set a security IP (IP #0) in region 1 of the HMB 14, and may set a 256-bit key (e.g., '110110000101001100 . . . '). The HMB manager 1181 may set a security IP (IP #2) in region N of the HMB 14, and may set a 128-bit key (e.g., '110011011 . . . ').

In one example, after the security policy is set, an abnormality detector 1183 may detect an abnormal operation of region 1 of the HMB 14, and may notify it to the HMB manager 1181. In this case, referring to FIG. 4B, the HMB manager 1181 may change the key of region 1 to a 256-bit key (e.g., '0001101000101111111 . . . ').

In another example, the abnormality detector 1183 may detect an abnormal operation of region 0 of the HMB 14 and notify the HMB manager 1181. In this case, referring to FIG. 4C, the HMB manager 1181 may convert the security IP of region 0 from the security IP of IP #1 to IP #0, and may change the key to a 256-bit key (e.g., '110110011101001100 . . . ').

In another example, the abnormality detector 1183 may detect an abnormal operation of region N of the HMB 14 and notify the HMB manager 1181. In this case, referring to FIG. 4D, the HMB manager 1181 may convert the security IP of region N from the security IP of IP #2 to IP #1.

The HMB manager 1181 may manage HMB-related information. For example, the HMB manager 1181 may generate and manage the HMB allocation table (HMBAT), the HMB mapping table (HMBMT), and the HMB state table (HMBST).

The security IP pool 1182 may include a plurality of security IPs (e.g., IP #0 to IP #n, wherein n is a natural number). Each of the plurality of security IPs (IP #0 to IP #n) may be implemented by a logical operation module that performs a security procedure according to a predetermined security policy. Different security policies are set for the plurality of security IPs (IP #0 to IP #n), so that the plurality of security IPs (IP #0 to IP #n) may generate key values in different ways. Accordingly, the plurality of security IPs (IP #0 to IP #n) may perform security procedures in different ways according to different security policies. The security procedure may include a procedure such as encryption, decryption, and authentication.

The security policy may be related to at least one of cyclic redundancy check (CRC) (e.g., CRC-16, CRC-32, CRC-64, CRC-128, CRC-256, etc.), a Hamming code, low-density parity check (LDPC), a Bose-Chaudhuri-Hocquenghem (BCH) code, a Reed-Solomon (RS) code, a Viterbi code, a turbo code, an advanced encryption standard (AES) (e.g., AES-128, AES-192, AES-256), a secure hash algorithm (SHA), a Rivest-Shamir-Adleman (RSA) algorithm, or peripheral component interconnect express integrity and data encryption (PCIe IDE) or data object exchange (PCIe DOE).

The encoder 1188 may generate encoded data by performing an encoding operation on data. The encoder 1188 may perform an encoding operation on data by using one of the plurality of security IPs (IP #0 to IP #n) selected by the HMB manager 1181. Data encoded by the encoder 1188 may be transmitted to the HMB 14.

The decoder 1189 may generate decoded data by performing a decoding operation on the encoded data. The decoded data may be data before encoding. The decoder 1189 may perform a decoding operation on the encoded data by using one of the plurality of secure IPs (IP #0 to IP #n) selected by the HMB manager 1181.

FIG. 2 shows that the encoder 1188 and the decoder 1189 are disposed at the outside of the security IP pool 1182, but the encoder 1188 and the decoder 1189 may be implemented as one module together with the security IP pool 1182.

The abnormality detector 1183 may monitor whether a condition for changing the security policy is satisfied. The change condition of the security policy may include a case in which an abnormal operation of at least one region of the HMB 14 occurs. When the change condition of the security policy is satisfied, the abnormality detector 1183 may output a change signal indicating that the change condition is satisfied to the HMB manager 1181.

The abnormality detector 1183 may include a timer 1184, a data integrity checker 1185, and an HMB allocation checker 1186.

The timer 1184 may be configured to count a predetermined time from a time point (hereinafter, a specific time point) at which a specific event related to the change condition of the security policy occurs. For example, the timer 1184 may be configured to count an elapsed time or a predetermined time from the specific time point by counting a system clock or an operation clock.

In an example embodiment, the timer 1184 may count the time elapsed from the specific time point (e.g., from the time point at which data is first written in the first region) for each of the plurality of regions. The count result of the timer 1184 is referred to as an elapsed time. When the elapsed time for each of the plurality of regions exceeds a reference time corresponding to elapsed time information included in the HMT state table (HMBST), the abnormality detector 1183 may determine that the change condition of the security policy for the corresponding region is satisfied. The reference time may be set differently for each data type or for each region. Accordingly, the abnormality detector 1183 outputs a change signal indicating that the change condition is satisfied to the HMB manager 1181, and the HMB manager 1181 may change the security policy for the specific region.

The data integrity checker 1185 may check the integrity of data stored in the plurality of regions of the HMB 14. For example, the data integrity checker 1185 may monitor an error rate of data.

In an example embodiment, the data integrity checker 1185 may refer to the HMB state table (HMBST) to determine whether the monitored error rate satisfies the change condition. For example, when a value of the monitored error rate reaches a threshold value, the change condition may be satisfied. Accordingly, the abnormality detector 1183 may output a change signal indicating that the change condition is satisfied to the HMB manager 1181, and the HMB manager 1181 may change the security policy for the specific region.

The HMB allocation checker 1186 may monitor state information of the plurality of regions of the HMB 14. For example, the HMB allocation checker 1186 may monitor a state of the memory device, a state of the HMB, a state of the plurality of regions, a type of the memory device, a ratio of regions of a memory that are invalid, and the like. In this case, the HMB allocation checker 1186 may perform monitoring by using log information of the plurality of regions.

In an example embodiment, the HMB allocation checker 1186 may refer to the HMB state table (HMBST) to determine whether the monitored states satisfy the change condition. For example, when a value of the monitored state rate reaches a threshold value, the change condition may be satisfied.

The threshold value may be selected in consideration of a level of a state for which a change condition operation is required.

Figure 5:
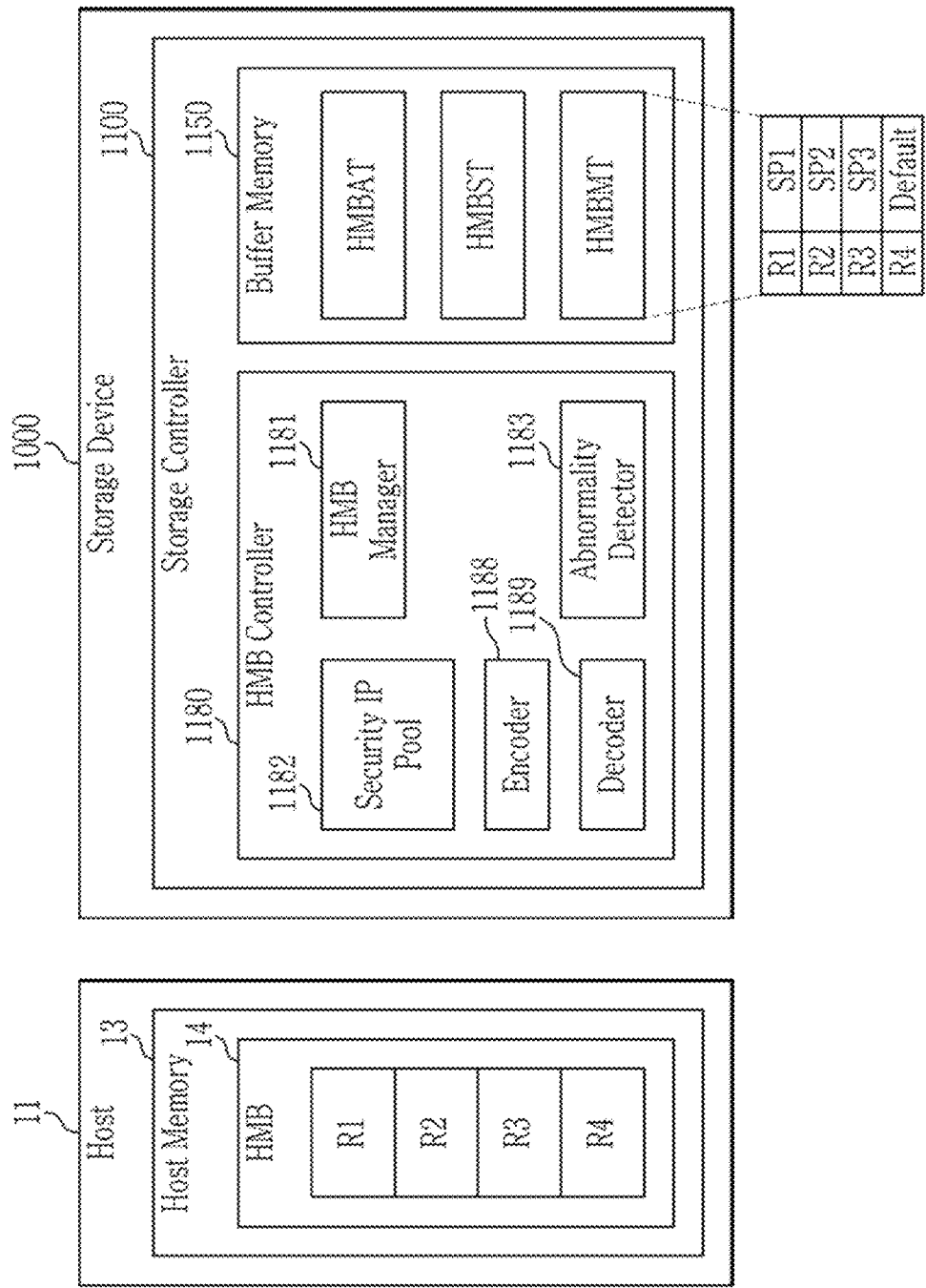
FIG. 5 illustrates an example of a plurality of regions of an HMB and a table managed by an HMB manager.

FIG. 5 illustrates an example of a plurality of regions of the HMB and a table managed by the HMB manager 1181.

Referring to FIGS. 1 and 5, the HMB manager 1181 may divide and manage the HMB 14 into a plurality of regions R1 to R4 based on the HMB allocation information provided from the host 11.

In the present example, the HMB 14 is described as including the first to fourth regions R1 to R4, but the number of regions included in the HMB 14 may be increased or decreased.

The HMB manager 1181 may manage HMB-related information. For example, the HMB manager 1181 may manage the HMB allocation table (HMBAT), the HMB state table (HMBST), and the HMB mapping table (HMBMT). The HMB allocation table (HMBAT), the HMB state table (HMBST), and the HMB mapping table (HMBMT) may be stored in the buffer memory 1150 or the nonvolatile memory device 1200.

In an example embodiment, the HMB manager 1181 may generate the HMB allocation table (HMBAT) based on the HMB allocation information to store it in the buffer memory 1150. The HMB manager 1181 may store and update allocation information for each of the plurality of regions R1 to R4 in the HMB allocation table (HMBAT). The allocation information for each region of the HMB 14 may be managed and updated in units of divided regions. For example, the allocation information may include tag information for each region, a type (or kind) of data stored or buffered in each region, a release priority for each region, a state of each region, a size of each region, a host memory address range for each region, a level of reliability requirements in each region, a level of security requirements in each region, and the like. The allocation information stored in the HMB allocation table (HMBAT) may include different parameters for each of the plurality of regions R1 to R4 of the HMB 14.

The tag information may be an attribute referenced to uniquely identify each of the plurality of regions R1 to R4 of the HMB 14. However, when another reference is used to uniquely identify the plurality of regions R1 to R4, the HMB allocation table (HMBAT) may include no tag information.

In an example embodiment, each of the plurality of regions R1 to R4 may be configured to store one type of data. For example, the type of data may include mapping data, user data, metadata (e.g., ECC data, state data, etc.), power gating data (e.g., data requiring preservation when power is interrupted), and the like. In an example embodiment, each of the plurality of regions R1 to R4 may store different types of data. Also, the type of data may include other types of data used in storage devices, and one region may store two or more types of data, or two or more regions may store one type of data, or the region may be configured regardless of data type.

The HMB manager 1181 may generate the HMB state table (HMBST), and may store and manage the HMB state table (HMBST) in the buffer memory 1150. The HMB manager 1181 may store and update degradation information or error information (i.e., state information) for each of the plurality of regions R1 to R4 in the HMB state table (HMBST).

The state information for each region of the HMB 14 may be managed and updated in units of divided regions. For example, the state information for each region may include the number of writes and reads in the corresponding region, and an error rate detected from data stored in the corresponding region (e.g., a ratio of the number of error bits to the total number of bits in the read data), an elapsed time, an occurrence ratio of errors (e.g., a ratio of a number of error detections and total number of HMB read requests), the number of read retries, a ratio of invalid memory spaces, an available capacity, and the like. However, the state information stored in the HMB state table (HMBST) may include different parameters for each of the plurality of regions R1 to R4 of the HMB 14.

The HMB manager 1181 may generate the HMB mapping table (HMBMT), and may store and manage the HMB mapping table (HMBMT) in the buffer memory 1150. The HMB manager 1181 may store and update the mapping information for each of the plurality of regions R1 to R4 and the security policy corresponding to each region in the HMB mapping table (HMBMT).

The HMB manager 1181 may select the security policy with respect to each of the plurality of regions R1 to R4, and may manage mapping information for the selected security policy by the HMB mapping table (HMBMT).

For example, the first region R1 may correspond to a first security policy SP1, the second region R2 may correspond to a second security policy SP2, and the third region R3 may correspond to a third security policy SP3. The HMB manager 1181 may set no security policy with respect to the fourth region R4. In this case, an initial value may be stored in a table cell related to the fourth region R4 in the HMB mapping table (HMBMT).

The HMB mapping table (HMBMT) shown in FIG. 5 is merely an example.

Figure 6:
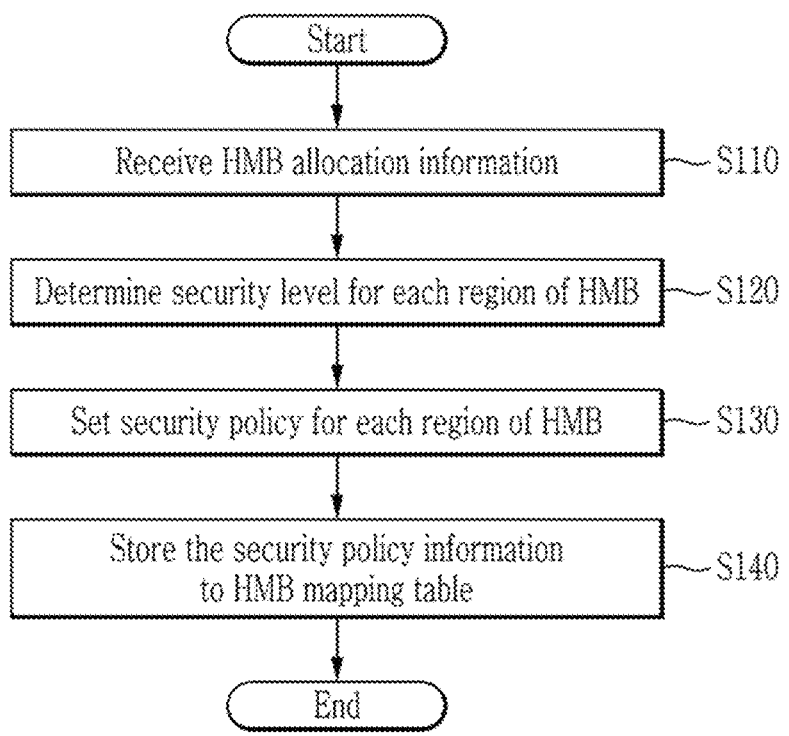
FIG. 6 illustrates a flowchart of an operation of a storage device.

FIG. 6 illustrates a flowchart of an operation of a storage device.

Referring to FIGS. 1, 5, and 6, in operation S110, the storage device 1000 may receive HMB allocation information from the host 11. For example, the storage device 1000 may receive the HMB allocation information through a set-feature command. The HMB allocation information may include HMB size information, HMB activation information, or an HMB descriptor list. The HMB descriptor list may include a plurality of HMB descriptor entries. The HMB descriptor entry may point to a memory address space allocated to the HMB. The HMB descriptor entry may include buffer address information and buffer size information. The buffer address may indicate the address information of the host memory buffer indicated by the HMB descriptor entry. The buffer size information may indicate the number of consecutive memory pages in the memory space indicated by the HMB descriptor entry.

In an example embodiment, the storage device 1000 may recognize the HMB 14 based on the HMB allocation information. The storage device 1000 may divide the HMB 14 into a plurality of regions, and the plurality of regions of the HMB 14 may be managed by the storage device 1000. For example, referring to FIG. 5, the storage device 1000 may divide the HMB 14 into the first to fourth regions R1 to R4 based on the HMB allocation information.

In an example embodiment, the plurality of regions managed by the storage device may be different from a plurality of memory spaces indicated by the HMB descriptor entry managed by the host. The storage device 1000 may recognize the memory spaces indicated by the HMB descriptor entries as the HMB 14. The storage device 1000 may classify and use the HMB 14 into a plurality of regions.

In operation S120, the storage device 1000 may determine a security level for each region of the HMB 14. In doing so, the storage device 1000 may use information of data stored in each region. For example, the storage device 1000 may determine a high-security level for a region having a high data reliability requirement, and may determine a low-security level for a region having a low data reliability requirement. As another example, the storage device 1000 may determine a high-security level for data (e.g., data that should not be easily decrypted externally) requiring high security and a low-security level for data (e.g., raw data, log data, etc.) requiring low security based on the type (or kind) of the data.

In operation S130, the storage device 1000 may set a security policy with respect to each region of the HMB 14. For example, the storage device 1000 may set one of a plurality of security policies with respect to the plurality of regions R1 to R4. The storage device 1000 may select the first security policy SP1 from among the plurality of security policies for the first region R1. The storage device 1000 may select the second security policy SP2 for the second region R2, and may select the third security policy SP3 for the third region R3. In an example, the storage device 1000 may select no security policy for the fourth region R4.

In operation S140, the storage device 1000 may store information about the security policy in the HMB mapping table (HMBMT). For example, referring to FIG. 5, the storage device 1000 may store the first security policy SP1 in the HMB mapping table (HMBMT) in relation to the first region R1. The storage device 1000 may store the second security policy SP2 in the HMB mapping table (HMBMT) in relation to the second region R2. The storage device 1000 may store the third security policy SP3 in the HMB mapping table (HMBMT) in relation to the third region R3. The storage device 1000 may store an initial value (default value) in the HMB mapping table (HMBMT) in relation to the fourth region R4, e.g., the storage device 1000 may set to apply no security policy to the fourth region R4, e.g., the storage device 1000 may not perform an encoding or decoding operation on data corresponding to the fourth region R4.

Figure 7:
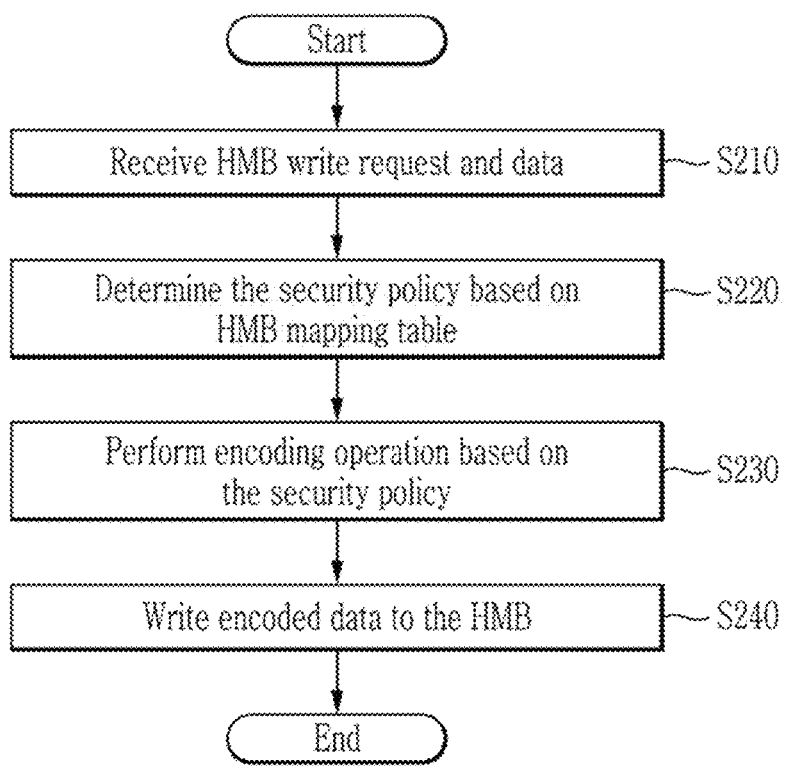
FIG. 7 illustrates a flowchart of an operation of an HMB controller of FIG. 1.

FIG. 7 illustrates a flowchart of an operation of an HMB controller of FIG. 1.

Referring to FIGS. 1 and 7, in operation S210, the HMB controller 1180 may receive an HMB write request and data. For example, the HMB controller 1180 may detect or receive an HMB write request to the HMB 14 provided from the CPU 1110 or the FTL 1120.

In operation S220, the HMB controller 1180 may determine the security policy based on the HMB mapping table (HMBMT). For example, the HMB controller 1180 may determine the region of the HMB 14 in which data is to be stored based on the HMB write request. For example, the HMB controller 1180 may determine a region of the HMB 14 in which data is to be stored among the plurality of regions R1 to R4 based on the address of the HMB 14 included in the HMB write request. In another implementation, the HMB controller 1180 may determine a region of the HMB 14 in which data is to be stored among the plurality of regions R1 to R4 based on the type (or kind) of data included in the HMB write request. The HMB controller 1180 may check the security policy corresponding to the region of the HMB 14 from the HMB mapping table (HMBMT) based on the region of the HMB 14 in which data is to be stored.

As an example, it is assumed that the address included in the HMB write request points to the first region R1 of the HMB 14. The HMB controller 1180 may determine that the region in which data is to be stored is the first region R1, based on the address included in the HMB write request. The HMB controller 1180 may determine that the security policy corresponding to the first region R1 is the first security policy SP1 based on the HMB mapping table (HMBMT).

In operation S230, the HMB controller 1180 may perform an encoding operation based on the determined security policy. For example, the HMB controller 1180 may perform an encoding operation on data based on the first security policy SP1.

In operation S240, the HMB controller 1180 may write the encoded data to the HMB 14. For example, the HMB controller 1180 may transmit a write command and the encoded data to the HMB 14. However, when the region of the HMB 14 corresponding to the HMB write request is the fourth region R4 (i.e., when the determined security policy indicates the initial value (default)), the HMB controller 1180 may not perform an encoding operation on data corresponding to the HMB write request. Accordingly, the HMB controller 1180 may write unencoded data to the HMB 14.

Figure 8:
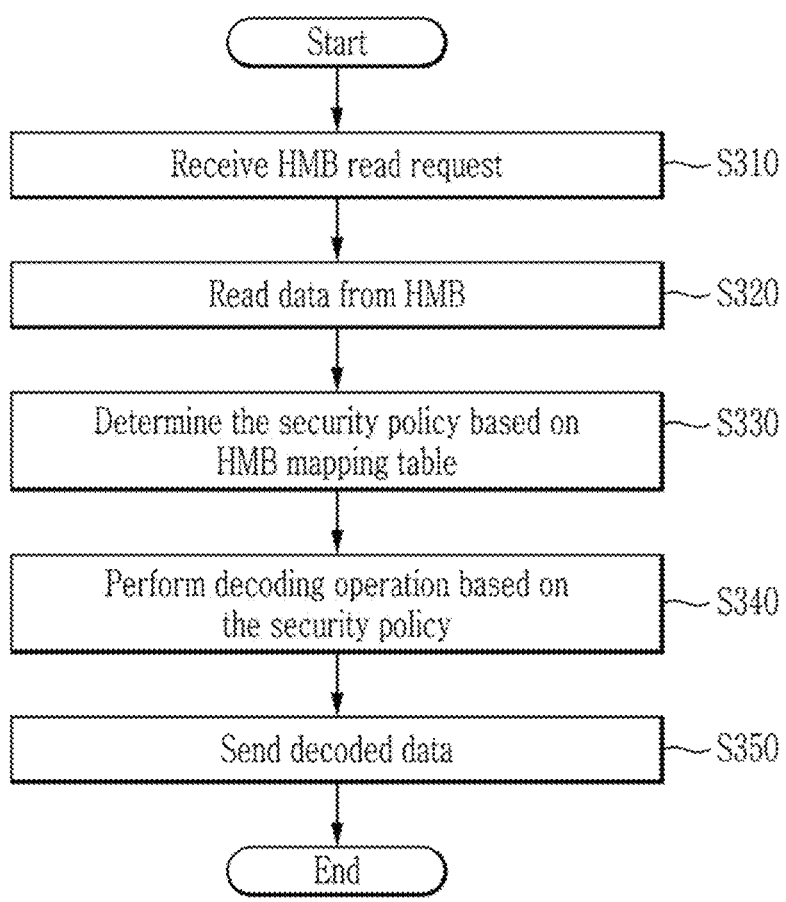
FIG. 8 illustrates a flowchart of an operation of an HMB controller of FIG. 1.

FIG. 8 illustrates a flowchart of an operation of an HMB controller of FIG. 1.

Referring to FIGS. 1 and 8, in operation S310, the HMB controller 1180 may receive an HMB read request. For example, the HMB controller 1180 may detect or receive a read request to the HMB 14 provided from the CPU 1110 or the FTL 1120.

In operation S320, the HMB controller 1180 may read data from the HMB 14. For example, the HMB controller 1180 may transmit a read command to the HMB 14 based on the HMB read request. The HMB controller 1180 may receive data corresponding to the read command from the HMB 14. For example, the HMB controller 1180 may generate a read command based on the address of the HMB 14 included in the HMB read request. In another implementation, the HMB controller 1180 may generate a read command based on the type (or kind) of data of the HMB 14 included in the HMB read request.

In operation S330, the HMB controller 1180 may determine the security policy based on the HMB mapping table (HMBMT). For example, the HMB controller 1180 may determine the region of the HMB 14 in which data is stored, based on the HMB read request.

For example, the HMB controller 1180 may determine the region of the HMB 14 in which data is stored among the plurality of regions R1 to R4 based on the address of the HMB 14 included in the HMB read request. In another implementation, the HMB controller 1180 may determine the region of the HMB 14 in which data is stored among the plurality of regions R1 to R4 based on the type (or kind) of data included in the HMB read request. The HMB controller 1180 may check the security policy corresponding to the region of the HMB 14 from the HMB mapping table (HMBMT) based on the region of the HMB 14 in which data is stored.

As an example, it is assumed that the address to be included in the HMB read request points to the first region R1 of the HMB 14. The HMB controller 1180 may determine that the region in which data is stored is the first region R1 based on the address included in the HMB read request. The HMB manager 1181 may determine that the security policy corresponding to the first region R1 is the first security policy SP1 based on the HMB mapping table (HMBMT).

In operation S340, the HMB controller 1180 may perform a decoding operation based on the determined security policy. For example, the HMB controller 1180 may perform a decoding operation on data based on the first security policy SP1. In this case, the HMB controller 1180 may detect whether there is an error in the data, determine whether the error is correctable when there is an error, and perform an error correction operation when the error is correctable. When the error cannot be corrected, the HMB controller 1180 may transmit a failure response to the HMB read request to the CPU 1110 or the FTL 1120.

In operation S350, the HMB controller 1180 may transmit the decoded data. For example, the HMB controller 1180 may transmit the decoded data to the CPU 1110 or the FTL 1120. However, when the region corresponding to the HMB read request is the fourth region R4 (i.e., when the determined security policy indicates the initial value (default)), the HMB controller 1180 may not perform a decoding operation on data corresponding to the HMB read request, and thus the HMB controller 1180 may transmit undecoded data to the CPU 1110 or the FTL 1120.

Figure 9:
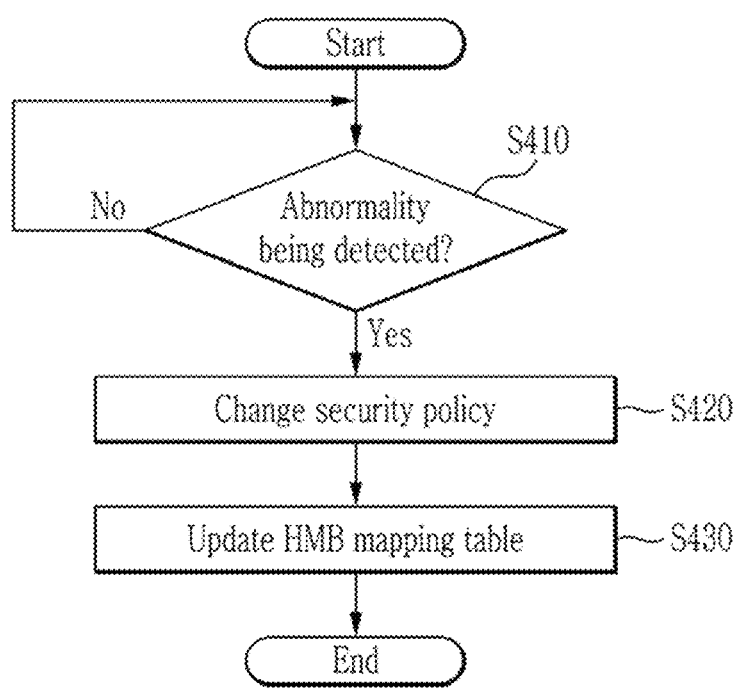
FIG. 9 illustrates a flowchart of an operation of an HMB controller of FIG. 1.

FIG. 9 illustrates a flowchart of an operation of the HMB controller of FIG. 1.

Referring to FIGS. 1 and 9, in operation S410, the HMB controller 1180 may determine whether the change condition is satisfied by determining whether an abnormal operation is detected in the HMB 14. The detection of the abnormal operation may mean that the security policy for the corresponding region should be changed.

When the change condition is satisfied, the HMB controller 1180 proceeds to operation S420, and when the change condition is not satisfied, the HMB controller 1180 proceeds to operation S410 again. Thus, when the change condition is not satisfied, the HMB controller 1180 may monitor whether the change condition is satisfied.

The HMB controller 1180 may determine that the change condition of the security policy is satisfied when a characteristic of a memory device corresponding to a specific region is changed, when a type of data to be stored in a specific region is changed, when a reliability requirement level for a specific region is changed, when a security requirement level for a specific region is changed, when a key validity time has elapsed, when a data integrity check fails, or when an abnormal memory buffer allocation is detected, as examples.

In an example embodiment, the HMB controller 1180 may detect whether a change the security policy with respect to each of the plurality of regions R1 to R4 is called for. Thus, the HMB controller 1180 may monitor a state related to the plurality of regions R1 to R4. The HMB controller 1180 may manage whether the monitored state satisfies the change condition. For example, the state monitored by the HMB controller 1180 may be related to various attributes such as a lifespan of each of the plurality of regions R1 to R4, reliability of data stored in each of the plurality of regions R1 to R4, and a state of the memory device corresponding to each of the plurality of regions R1 to R4.

When the change condition is satisfied, this may indicate that it is required to change the security policy for the region in which the change condition is satisfied in the storage device 1000 to improve the operating environment and characteristics of the storage device 1000 or the HMB 14. The storage device 1000 may be implemented to change a security policy for a specific region in order to improve an operating environment and characteristics of the storage device 1000 or the HMB 14.

In an example embodiment, when the value of the monitored state reaches a threshold value, the HMB controller 1180 may determine that the monitored state satisfies the change condition. For example, regarding the first condition, the HMB controller 1180 may manage a time elapsed from a time point when data is first written in each of the plurality of regions R1 to R4, that is, an elapsed time of each of the plurality of regions R1 to R4. For example, the HMB controller 1180 may determine whether the elapsed time of each of the plurality of regions R1 to R4 reaches a reference time. The HMB controller 1180 may use a timer, a time stamp, and the like.

Regarding the second condition, the HMB controller 1180 may manage an error rate of each of the plurality of regions R1 to R4. For example, the HMB controller 1180 may monitor the error rate of each of the plurality of regions, and may determine whether the error rate reaches a reference error rate.

Regarding the third condition, the HMB controller 1180 may manage the allocation information of the HMB 14 by the host 11. The HMB controller 1180 may determine whether the memory space of the host memory 13 for the plurality of regions (R1-R4) is changed based on the HMB mapping table (HMBMT). Thus, the HMB controller 1180 may determine whether the allocation information for the plurality of regions R1 to R4 is changed.

Regarding the fourth condition, the HMB controller 1180 may manage the memory device corresponding to the HMB 14. For example, the HMB controller 1180 may receive information about the memory device corresponding to the HMB 14 from the host 11. The HMB controller 1180 may determine whether the information about the memory device corresponding to the HMB 14 is received.

The above-described first to fourth conditions are only some of the possible examples of the change condition, and the specific conditions may be variously changed or modified.

In an example embodiment, the change condition may include all of the first to fourth conditions. For example, the HMB controller 1180 may determine whether the first condition to the fourth condition are satisfied with respect to a specific region. Thus, the HMB controller 1180 may simultaneously monitor all of the first to fourth conditions.

In an example embodiment, the change condition may include at least one of the first to fourth conditions. For example, the HMB controller 1180 may determine whether the first condition is satisfied or whether the fourth condition is satisfied, with respect to a specific region. Thus, the HMB controller 1180 may monitor at least one of a plurality of conditions.

In an example embodiment, the HMB controller 1180 may change the security policy for a specific region when one of the first to fourth conditions is satisfied. For example, even when only the first condition is satisfied and the second to fourth conditions are not satisfied, the HMB controller 1180 may determine that the change condition is satisfied, and may change the security policy for a specific region.

In an example embodiment, the HMB controller 1180 may change the security policy for a specific region when at least two of the plurality of conditions are satisfied. For example, when only the first condition is satisfied and the second to fourth conditions are not satisfied, the HMB controller 1180 may determine that the change condition is not satisfied. When the first and second conditions are satisfied and the third and fourth conditions are not satisfied, the HMB controller 1180 may determine that the change condition is satisfied, and may change the security policy for a specific region.

As described above, the change condition may include one of the first to fourth conditions or a combination of at least two thereof. However, may be variously changed or modified.

In operation S420, the HMB controller 1180 may change the security policy. For example, the HMB manager 1181 may change a security policy for a region in which the change condition is satisfied among the plurality of regions R1 to R4. For example, when it is assumed that the change condition of the first region R1 is satisfied, the HMB manager 1181 may change the security policy of the first region R1 from the first security policy SP1 to the fourth security policy SP4.

In operation S430, the HMB controller 1180 may update the HMB mapping table (HMBMT). The HMB manager 1181 may store the newly selected security policy in the HMB mapping table (HMBMT) in relation to the corresponding region. For example, when the security policy of the first region R1 is changed from the first security policy SP1 to the fifth security policy SP5, the HMB controller 1180 may store the fifth security policy SP5 in the HMB mapping table (HMBMT) in relation to the first region R1.

As will now be described, the HMB controller 1180 may determine whether change conditions described below are satisfied for all of the plurality of regions R1 to R4. However, for better comprehension and ease of description of the drawings, it will be described whether the change condition is satisfied with respect to one specific region below. It is assumed that one specific region is the first region R1. However, it will be understood that all of the following descriptions may be applied to the remaining regions R2 to R3.

Figure 10:
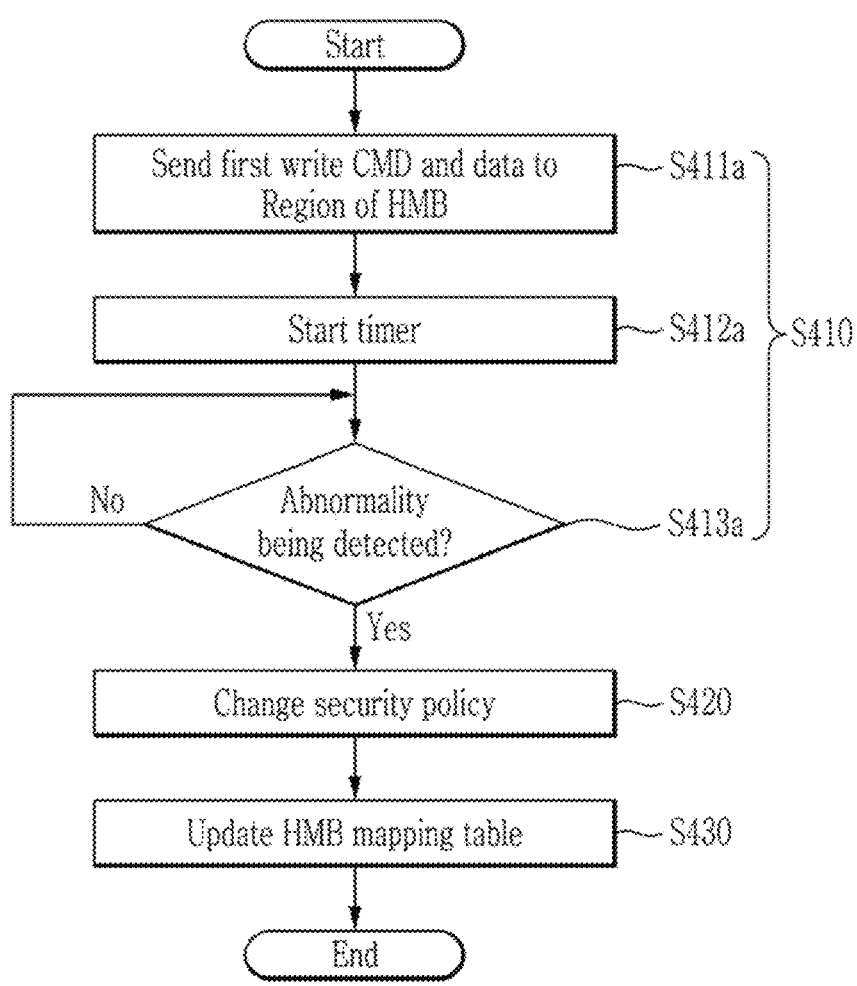
FIG. 10 illustrates a flowchart of operation S410 of FIG. 9 in more detail.
Figure 11A:
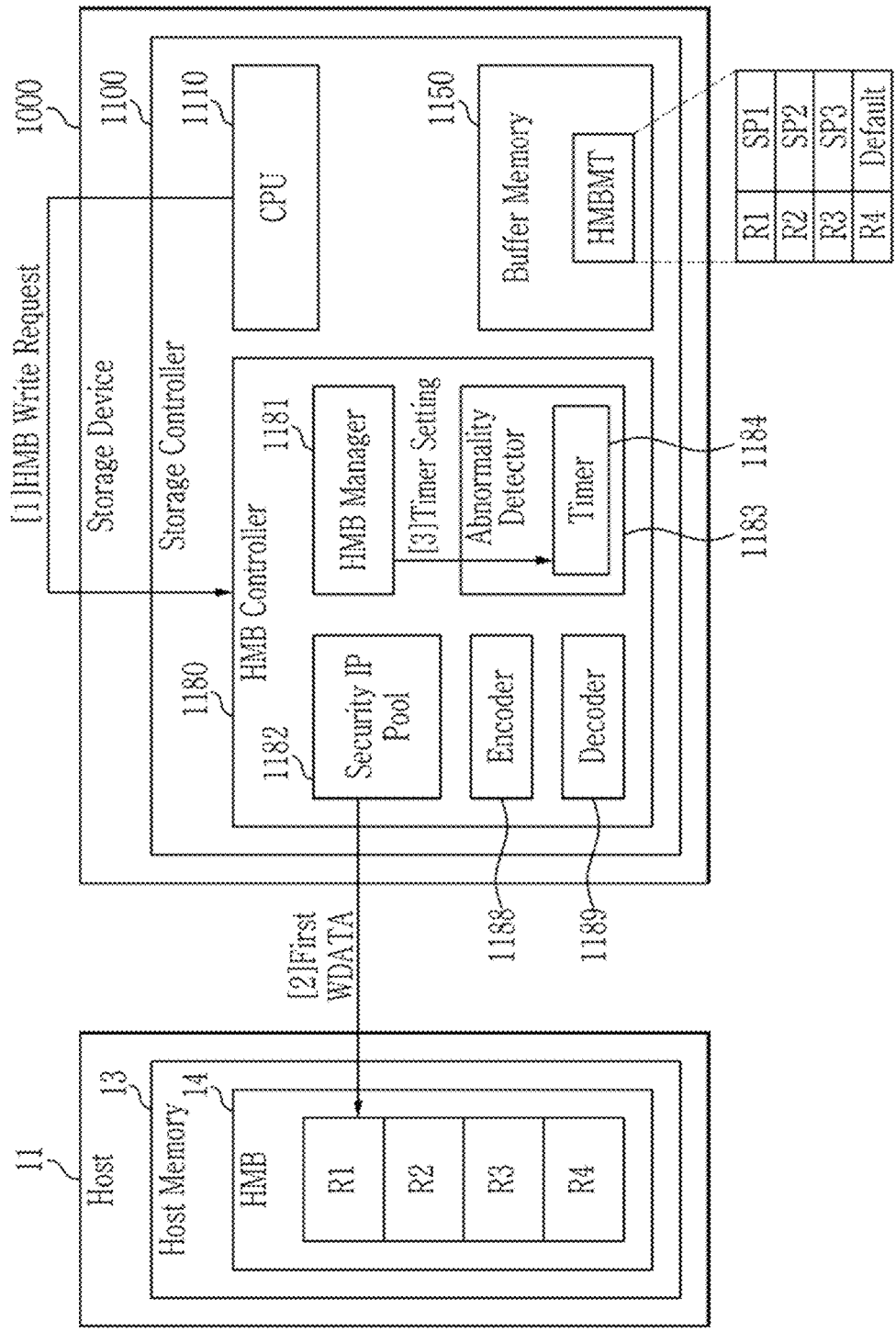
FIGS. 11A and 11B illustrate examples of an operation of a storage device of FIG. 1.
Figure 11B:
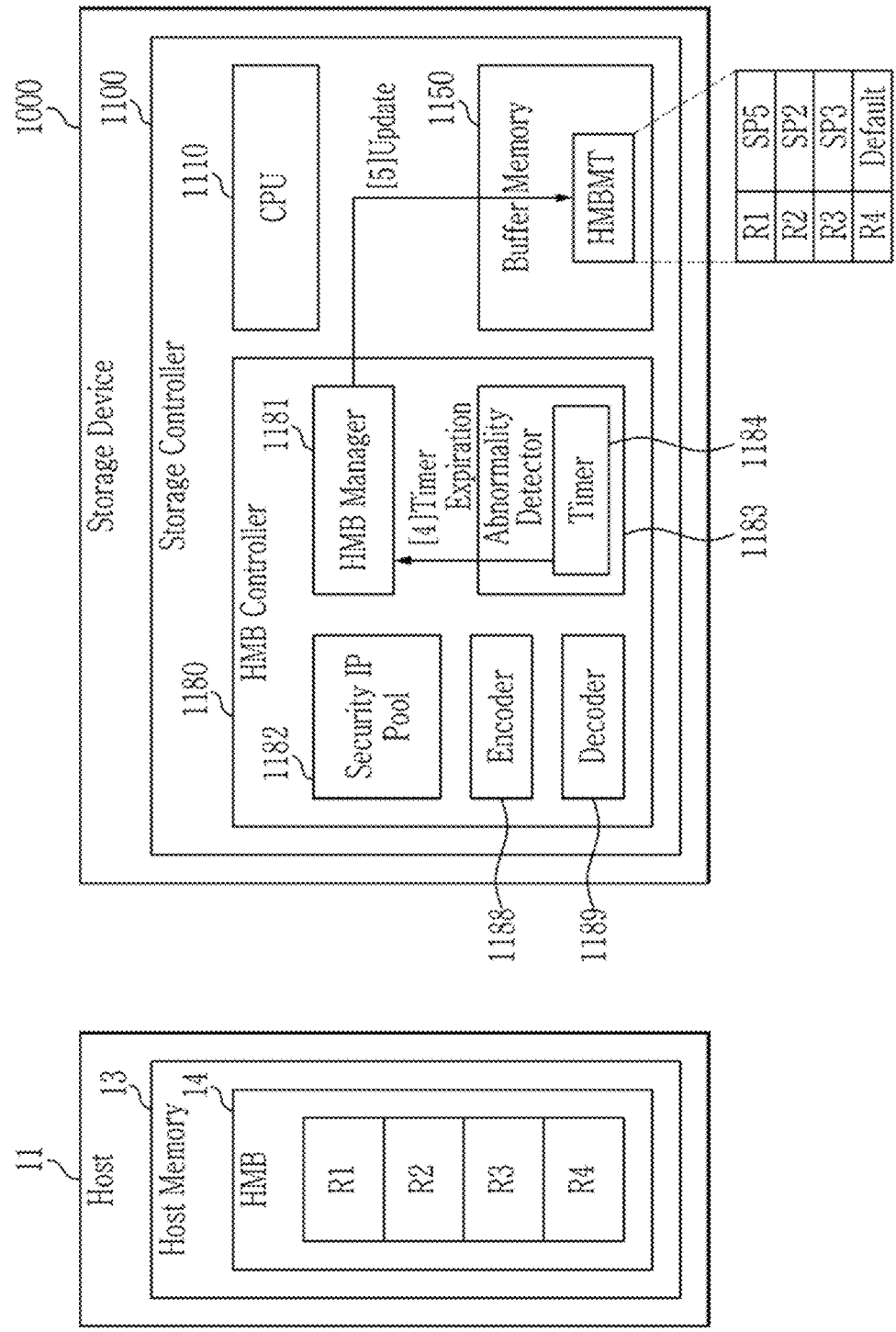

FIG. 10 illustrates a flowchart of operation S410 of FIG. 9 in more detail. FIGS. 11A and 11B illustrate examples of an operation of a storage device of FIG. 1.

Referring to FIGS. 1, 10, and 11A-11B, operation S410 of FIG. 9 may include operations S411a, S412a, and S413a of FIG. 10.

In operation S411a, the HMB controller 1180 may transmit a first write command and data to a specific region of the HMB 14. For example, the CPU 1110 may transmit a first HMB write request for the first region R1 to the HMB controller 1180 (see [1] of FIG. 11A). For example, the CPU 1110 may transmit an HMB write request to the HMB controller 1180 to write data into the first region R1 for the first time.

The HMB controller 1180 may transmit first write data to the first region R1 (see [2] of FIG. 11A). For example, the security IP pool 1182 may perform an encoding operation on data based on the first security policy SP1 corresponding to the first region R1. The security IP pool 1182 may send the first write command and the encoded write data to the host 11. The HMB controller 1180 may transmit a write command and data for the first time in a state in which no data is stored in the first region R1. Thus, the HMB controller 1180 may write data in the first region R1 for the first time.

In operation S412a, the HMB controller 1180 may start the timer 1184. The HMB controller 1180 may start a counting operation of the timer 1184 corresponding to the first region R1. In an example embodiment, the HMB manager 1181 may set a reference time of the timer 1184 corresponding to the first region R1 (see [3] of FIG. 11A).

For example, the reference time may be selected based on a type of data to be stored in the first region R1 and characteristics of the host memory device corresponding to the first region R1. The reference time may be set to determine when to change the security policy for the first region R1. For example, in order to provide reliability of data before data loss, a reference time for determining when the HMB controller 1180 performs a security policy change operation may be set. The reference time may be a predetermined value. The reference time may be chosen to be fixed or variable by a designer, a manufacturer, and/or a user. For example, the reference time may be adjustable by the HMB controller 1180 depending on a state of the host memory device or a type of data.

In operation S413a, the HMB controller 1180 may determine whether the timer 1184 has expired based on a signal from the timer 1184 corresponding to the region of the HMB 14. The expiration of the timer 1184 may mean that the elapsed time counted by the timer 1184 corresponding to the corresponding region exceeds the reference time.

For example, the HMB manager 1181 may determine whether the timer 1184 corresponding to the first region R1 has expired. The timer 1184 may count a time elapsed from a time point when data is first written in the first region R1. When the timer 1184 for the first region R1 has expired, the timer 1184 may output a signal indicating the lapse or expiration of the reference time to the HMB manager 1181 (see [4] of FIG. 11B). Accordingly, the HMB manager 1181 may determine that the change condition for the first region R1 is satisfied.

When the timer 1184 has expired, the HMB controller 1180 may proceed to operation S420, and when the timer 1184 has not expired, the HMB controller 1180 may continue the determination operation of operation S413a.

In operation S420, the HMB controller 1180 may change the security policy corresponding to the first region R1. For example, the HMB manager 1181 may change the security policy of the first region R1 based on a signal outputted from the timer 1184 (i.e., based on the lapse or expiration of the reference time). The HMB manager 1181 may change the first security policy SP1 to the fifth security policy SP5 for the first region R1.

In operation S430, the HMB controller 1180 may update the HMB mapping table (HMBMT). For example, the HMB manager 1181 may update the security policy for the first region R1 to the fifth security policy SP5 (see [5] of FIG. 11B).

Figure 12:
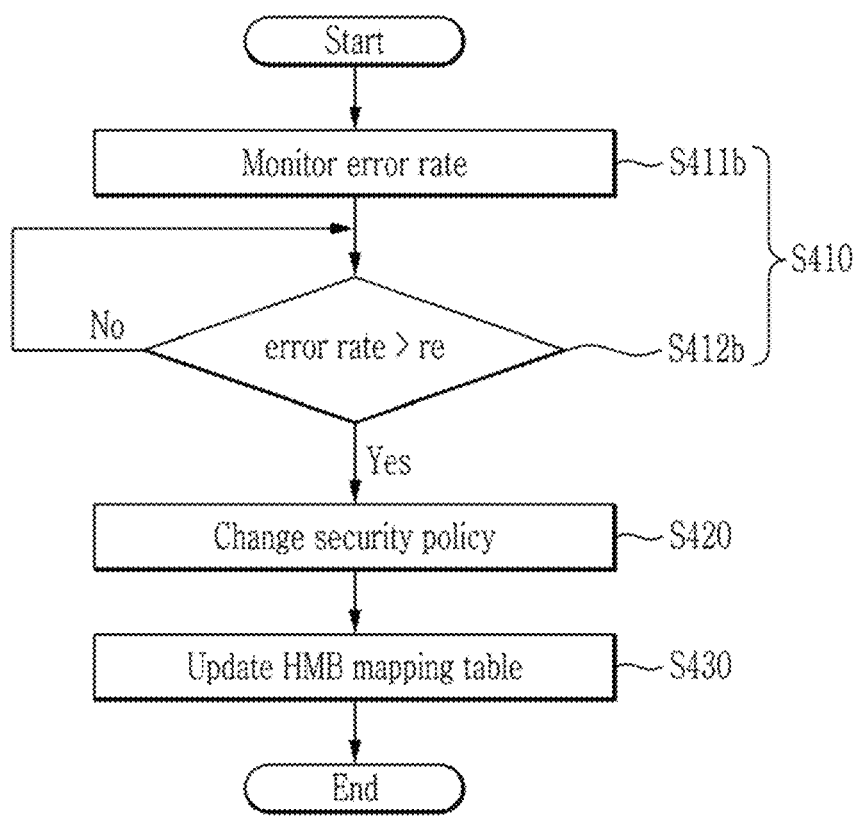
FIG. 12 illustrates a flowchart of operation S410 of FIG. 9 in more detail.
Figure 13A:
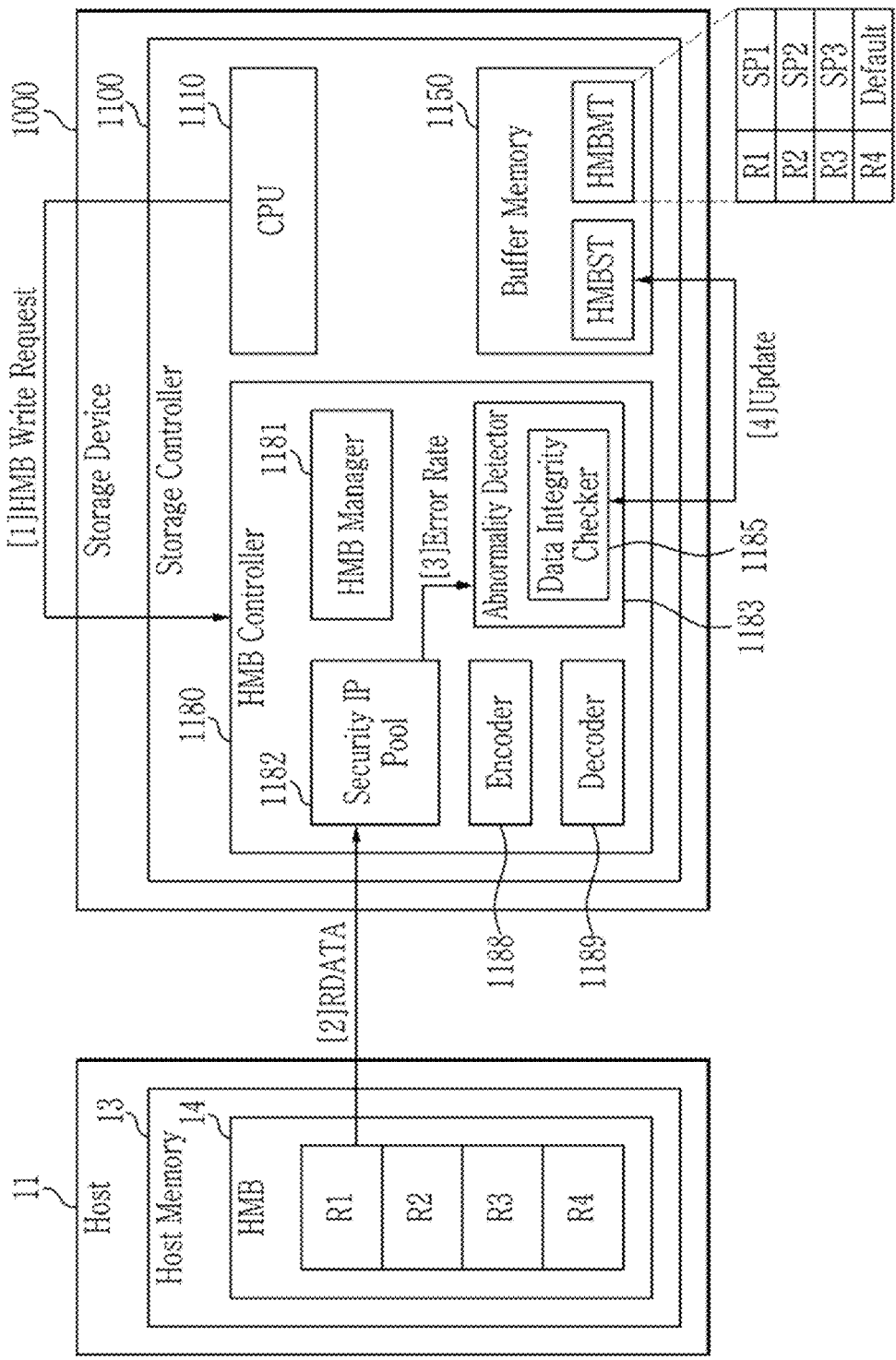
FIGS. 13A and 13B illustrate examples of an operation of a storage device of FIG. 1.
Figure 13B:
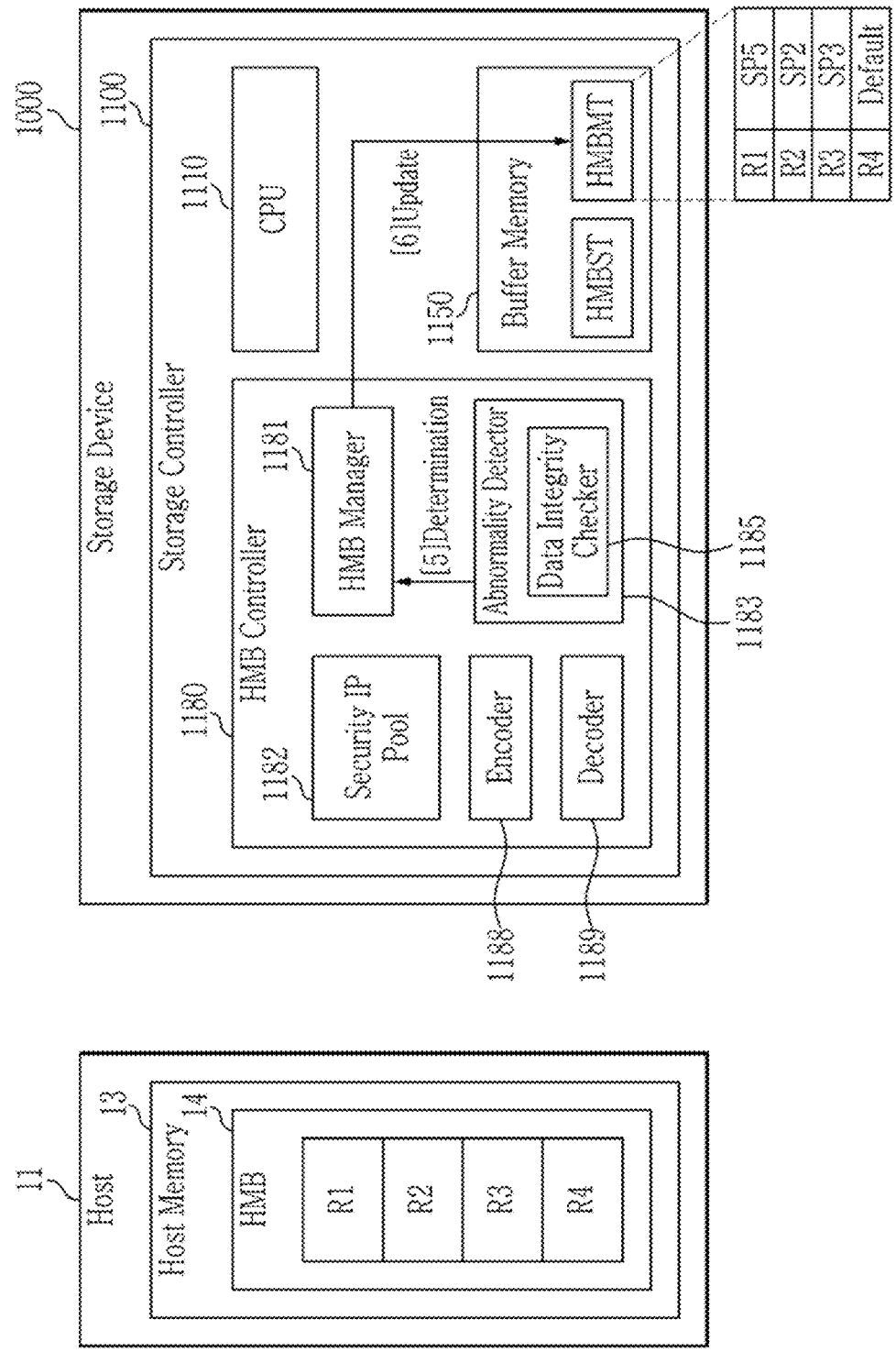

FIG. 12 illustrates a flowchart of operation S410 of FIG. 9 in more detail. FIGS. 13A and 13B illustrate examples of an operation method of the storage device of FIG. 1.

Referring to FIGS. 12 and 13A-13B, operation S410 of FIG. 9 may include operation S411b and operation S412b of FIG. 12.

In operation S411b, the HMB controller 1180 may monitor the error rate. For example, the CPU 1110 may transmit an HMB read request for the first region R1 to the HMB controller 1180 (see [1] of FIG. 13A). The security IP pool 1182 may read read data (RDATA) from the first region R1 (see [2] of FIG. 13A). The security IP pool 1182 may determine whether there is an error in the read data. When an error exists, the security IP pool 1182 may detect the error rate. In another implementation, when an error exists, the security IP pool 1182 may calculate the error rate. The error rate may mean a ratio between the number of error bits and a total number of bits of the read data. The security IP pool 1182 may transmit the error rate to the data integrity checker 1185 (see [3] of FIG. 13A). The data integrity checker 1185 may monitor the error rate. The data integrity checker 1185 may store or update the error rate in the HMB state table (HMBST) (see [4] of FIG. 13A).

In operation S412b, the HMB controller 1180 may determine whether the error rate exceeds a reference error rate (re). For example, the data integrity checker 1185 may detect whether the error rate corresponding to the first region R1 reaches a reference error rate corresponding to the first region R1 with reference to the HMB state table (HMBST). When the error rate reaches the reference error rate, the data integrity checker 1185 proceeds to operation S420, and when the error rate does not reach the reference error rate, the data integrity checker 1185 proceeds to operation S412*b*. When the error rate reaches the reference error rate, the data integrity checker 1185 may determine that the change condition is satisfied. The HMB controller 1180 may additionally determine whether the error is correctable, and, when correctable, it may perform an error correction operation. The data integrity checker 1185 may output a signal indicating that the change condition is satisfied to the HMB manager 1181 (see [5] of FIG. 13B).

In operation S420, the HMB controller 1180 may change the security policy of the first region R1 from the first security policy SP1 to the fifth security policy SP5 in response to the signal outputted from the data integrity checker 1185 (i.e., based on the error rate reaching the reference error rate).

In operation S430, the HMB controller 1180 may update the HMB mapping table (HMBMT). For example, the HMB manager 1181 may update the security policy for the first region R1 to the fifth security policy SP5 (see [6] of FIG. 13B).

In an example embodiment, the storage device 1000 may monitor a state related to reliability and security of data in addition to the error rate. For example, the monitored state may include an elapsed time of each of the regions of the HMB 14, an error occurrence rate (i.e., a ratio of the number of error detections and a total number of the HMB read requests), the number of writes, the number of reads, the number of read retries, and a ratio of invalid memory spaces, available capacity, and the like.

In an example embodiment, the abnormality detector 1183 may determine whether the monitored state satisfies the change condition. For example, when a value of the monitored state rate reaches a threshold value, the change condition may be satisfied. The threshold value may be selected in consideration of the level of reliability and security required for each region.

In an implementation, the abnormality detector 1183 may manage the elapsed time by using the data integrity checker 1185 instead of using the timer 1184. The data integrity checker 1185 may manage various times of each of the plurality of regions R1 to R4. For example, the HMB manager 1181 may manage the elapsed time of the plurality of regions R1 to R4. The elapsed time indicates an elapsed time from a time point when each of the plurality of regions first writes data to a current time. The HMB manager 1181 may store a time point when data is first written in the region, that is, a start time, as a timestamp in the HMB state table (HMBST).

The data integrity checker 1185 may calculate a difference between a start time stored in the HMB state table (HMBST) and a current time as an elapsed time, with reference to the HMB state table (HMBST). The data integrity checker 1185 may compare the calculated elapsed time with the reference time to determine whether the elapsed time exceeds the reference time. When the elapsed time exceeds the reference time, the data integrity checker 1185 may detect that the change condition of the first region R1 is satisfied. The data integrity checker 1185 may output a signal indicating that the change condition is satisfied to the HMB manager 1181.

In addition, the data integrity checker 1185 may manage an error occurrence ratio. The data integrity checker 1185 may manage the error occurrence ratio (i.e., a ratio of the number of error occurrences to the number of the HMB reads) based on the HMB state table (HMBST). The data integrity checker 1185 may calculate the error occurrence ratio whenever an HMB read operation is performed. The data integrity checker 1185 may store or update the error occurrence ratio in the HMB state table (HMBST). When the error occurrence ratio reaches a threshold value (e.g., when the error occurrence ratio becomes higher than the threshold value), the data integrity checker 1185 may output a signal indicating that the change condition is satisfied to the HMB manager 1181.

Figure 14:
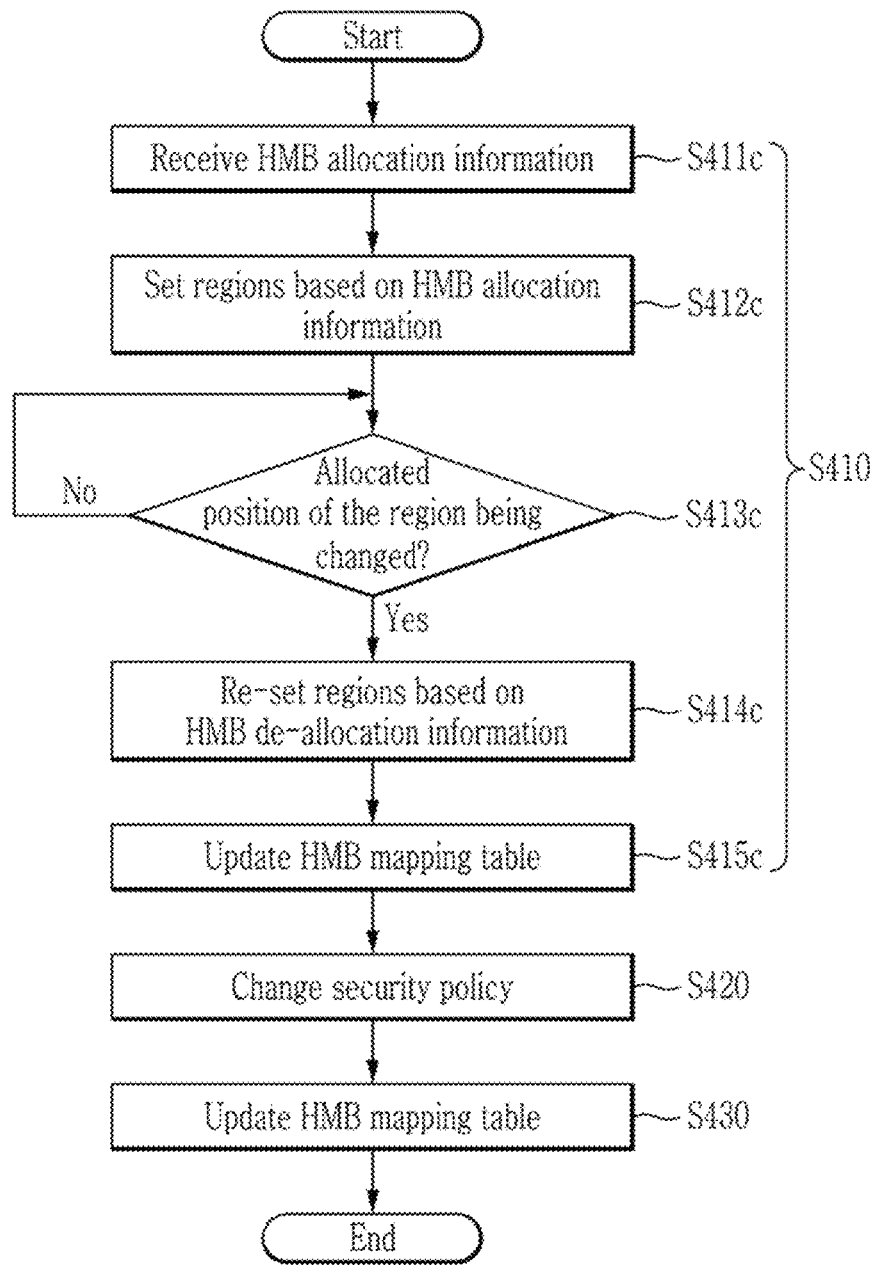
FIG. 14 illustrates a flowchart of operation S410 of FIG. 9 in more detail.
Figure 15A:
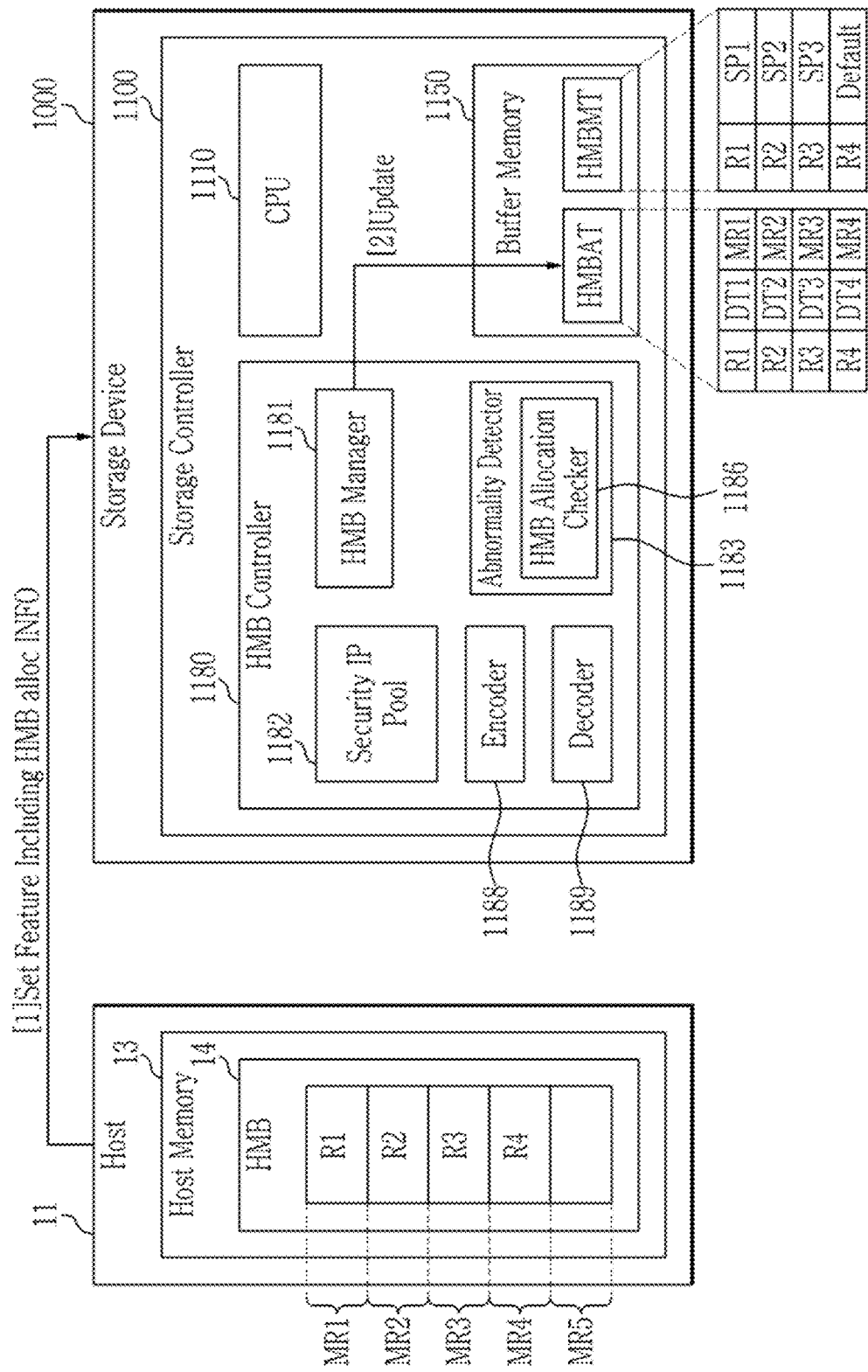
FIGS. 15A and 15B illustrate examples of an operation of a storage device of FIG. 1.
Figure 15B:
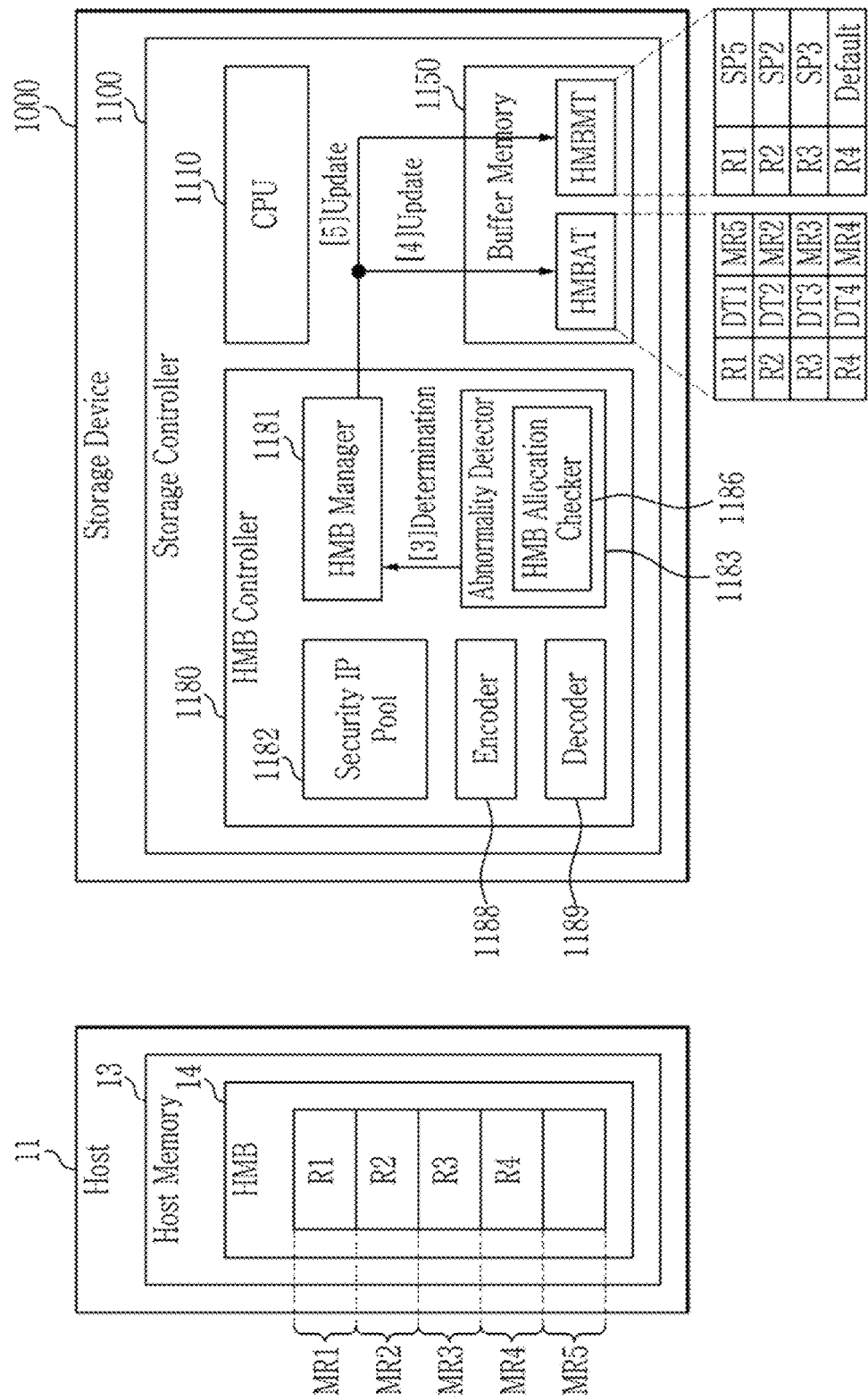

FIG. 14 illustrates a flowchart of operation S410 of FIG. 9 in more detail. FIGS. 15A and 15B illustrate examples of an operation of the storage device of FIG. 1.

Referring to FIGS. 14 and 15A-15B, the storage device 1000 may change the security policy of a specific region based on the change of the allocation region of the HMB 14 of the host 11.

A case in which the host 11 de-allocates the memory space of the HMB 14 that has already been allocated for use of the storage device 1000, or a case in which the host 11 requests a return of the memory space of the HMB 14 that has already been allocated, may occur. For example, the host 11 may de-allocate the allocated memory space of the HMB 14 by setting a memory return (MR) field included in a set-feature command (e.g., a feature identifier (FID) indicates a host memory buffer) to '1'.

The HMB manager 1181 may allocate a region corresponding to the de-allocated memory space of the HMB 14 to another memory space. For example, an unused portion of the memory space of the HMB 14 that has already been allocated may be allocated as a region. In another implementation, the host 11 may further allocate a new memory space of the host memory 13 to the HMB 14. For example, the host 11 may allocate the new memory space to the HMB 14 through a set-feature command. The HMB manager 1181 may allocate the new memory space to a region of the de-allocated memory space.

In an example embodiment, operation S410 of FIG. 9 may include operations S411*c* S415*c* of FIG. 14.

In operation S411*c*, the storage device 1000 may receive HMB allocation information from the host 11. For example, the host 11 may transmit a set-feature command including the HMB allocation information to the storage device 1000 (see [1] of FIG. 15A). The set-feature command may include first to fifth memory address ranges MR1 to MR5. For example, the first to fifth memory address ranges MR1 to MR5 may indicate ranges of addresses corresponding to the HMB 14 in the host memory 13.

In operation S412*c*, the storage device 1000 may set the plurality of regions R1 to R4 based on the HMB allocation information. For example, the HMB manager 1181 may partition the HMB 14 into the first to fourth regions R1 to R4 in response to the HMB allocation information of the host 11. The HMB manager 1181 may allocate the first region R1 to the first memory address range MR1 of the host memory 13, the second region R2 to the second memory address range MR2 of the host memory 13, the third region R3 to the third memory address range MR3 of the host memory 13, and the fourth region R4 to the fourth memory address range MR4 of the host memory 13. The HMB manager 1181 may leave the fifth memory address range MR5 as a free space without allocating it to any region.

In an example embodiment, the HMB manager 1181 may determine to store a first data type DT1 in the first region R1, may determine to store a second data type DT2 in the second region R2, may determine to store a third data type DT3 in the third region R3, and may determine to store a fourth data type DT4 in the fourth region R4.

In an example embodiment, the HMB manager 1181 may update the HMB allocation table (HMBAT) (see [2] of FIG. 15A). For example, the HMB manager 1181 may store the first data type DT1 and the first memory address range MR1 in relation to the first region R1 in the HMB mapping table (HMBMT), the second data type DT2 and the second memory address range MR2 in relation to the second region R2 in the HMB mapping table (HMBMT), the third data type DT3 and the third memory address range MR3 in relation to the third region R3 in the HMB mapping table (HMBMT), and the fourth data type DT4 and the fourth memory address range MR4 in relation to the fourth region R4 in the HMB mapping table (HMBMT).

In operation S413c, the storage device 1000 may determine whether an allocated position of a region is changed by monitoring the state information of the plurality of regions. The storage device 1000 may determine whether the allocated position is changed based on the set-feature command received from the host 11.

For example, the storage device 1000 may count the number of times that the allocated positions of the plurality of regions are changed. When the number of the position changes exceeds a threshold value, the storage device 1000 may determine that the HMB 14 abnormally operates.

As another example, the storage device 1000 may count the number of times the allocations of the plurality of regions are de-allocated. When the number of deallocation times exceeds the threshold value, the storage device 1000 may determine that the HMB 14 abnormally operates.

The threshold may be selected in consideration of a situation in which an abnormal operation occurs and, e.g., may be set to 1.

In an example embodiment, the HMB allocation checker 1186 may monitor the allocation information of each of the plurality of regions. When it is determined that the HMB 14 abnormally operates, the HMB allocation checker 1186 may output a signal indicating that the change condition is satisfied to the HMB manager 1181 (see [3] of FIG. 15B), and may proceed to operation S420. When the allocated position of any region is not changed, the storage device 1000 proceeds to operation S413c again.

In operation S414c, the storage device 1000 may reset the plurality of regions based on the changed positions of the regions. For example, the storage device 1000 may determine that the first memory address range MR1 has been de-allocated, and determine that the HMB 14 abnormally operates. Accordingly, the HMB manager 1181 may set the first region R1 again. Since the HMB manager 1181 cannot use the first memory address range MR1, the fifth memory address range MR5 to which no region is yet allocated may be set to the first region R1. Thus, the HMB manager 1181 may allocate the first region R1 to the fifth memory address range MR5 of the host memory 13.

In operation S415c, the HMB controller 1180 may update the HMB allocation table (HMBAT). For example, in relation to the first region R1, the HMB manager 1181 may store the fifth memory address range MR5 in the HMB allocation table (HMBAT) (see [4] of FIG. 15B). In an example embodiment, since the allocation information for the first region R1 has been changed, the HMB manager 1181 may determine that the condition for changing the security policy for the first region R1 is satisfied.

In operation S420, the HMB controller 1180 may change the security policy. For example, the HMB manager 1181 may change the security policy of the first region R1 from the first security policy SP1 to the fifth security policy SP5 based on the change of the HMB allocation information for a signal or region outputted from the HMB allocation checker 1186.

In operation S430, the HMB controller 1180 may update the HMB mapping table (HMBMT). For example, the HMB manager 1181 may update the security policy for the first region R1 to the fifth security policy SP5 (see [5] of FIG. 15B).

Figure 16:
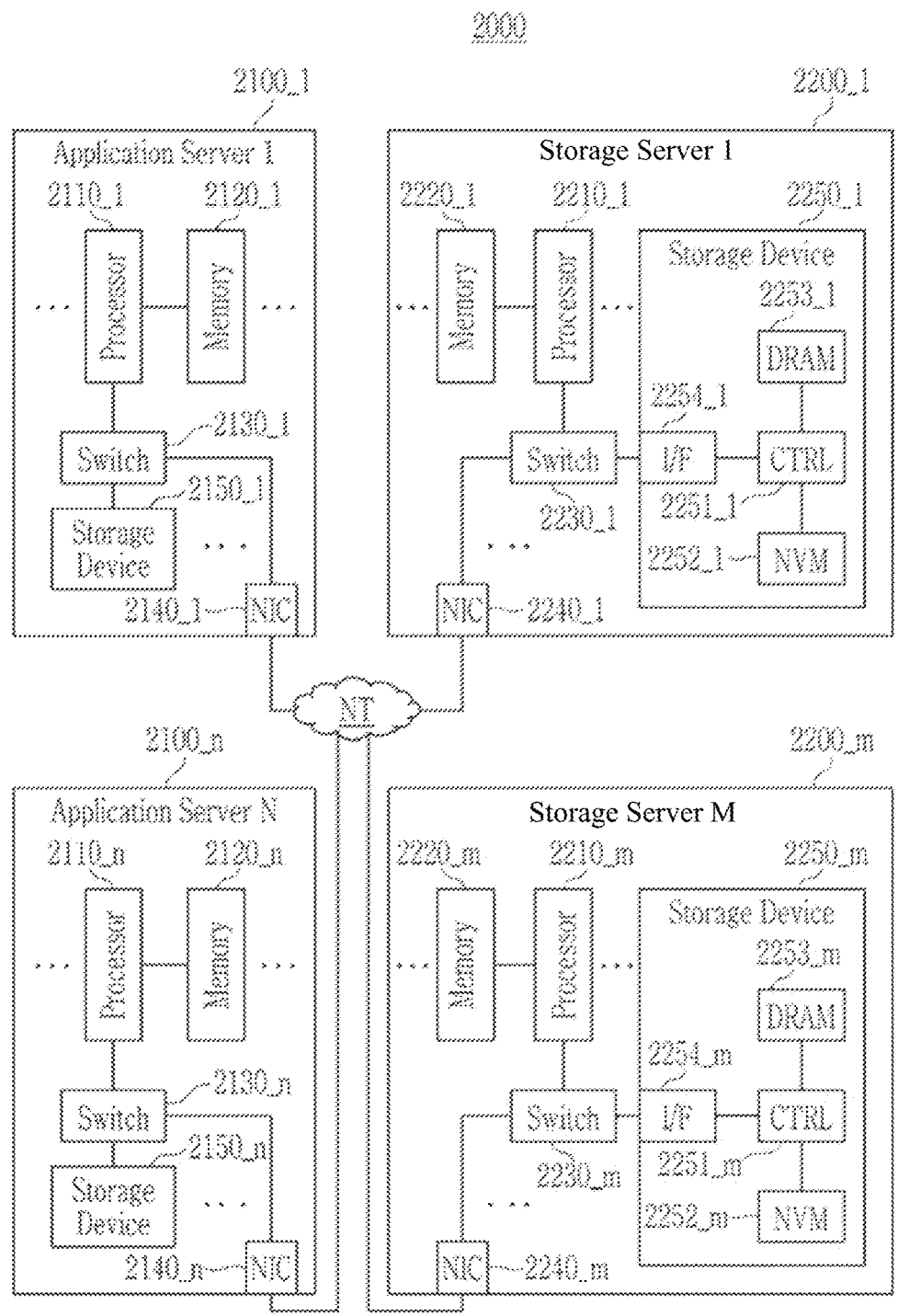
FIG. 16 illustrates a block diagram of a data center to which a storage device according to an example embodiment is applied.

FIG. 16 illustrates a block diagram of a data center to which the storage device according to the embodiment of the present disclosure is applied.

A data center 2000 may be a facility that maintains and manages various data and provides various services for various data, and may be referred to as a data storage center. The data center 2000 may be a system for operating a search engine or a database, and may be a computing system used in various institutions.

The data center 2000 may include a plurality of application servers 2100_1 to 2100_n and a plurality of storage servers 2200_1 to 2200_m. The number of the plurality of application servers 2100_1 to 2100_n and the number of the plurality of storage servers 2200_1 to 2200_m may be variously changed.

Hereinafter, for better understanding and ease of description, an example of the first storage server 2200_1 will be described. Each of the remaining storage servers 2200_2 to 2200_m and each of the plurality of application servers 2100_1 to 2100_n may have a structure similar to that of the first storage server 2200_1.

The first storage server 2200_1 may include a processor 2210_1, a memory 2220_1, a switch 2230_1, a network interface connector (NIC) 2240_1, and a storage device 2250_1. The processor 2210_1 may control the overall operation of the first storage server 2200_1. The memory 2220_1 may store various commands or data under control of the processor 2210_1. The processor 2210_1 may be configured to access the memory 2220_1 to execute various commands or process data. In an example embodiment, the memory 2220_1 may include at least one of various types of memory devices such as a double data rate synchronous DRAM (DDR SDRAM), a high bandwidth memory (HBM), a hybrid memory cube (HMC), a dual in-line memory module (DIMM), an Optane MINIM, and a non-volatile DIMM (NVDIMM).

In an example embodiment, the number of the processors 2210_1 and the number of the memories 2220_1 included in the first storage server 2200_1 may be variously changed. In an example embodiment, the processor 2210_1 and the memory 2220_1 included in the first storage server 2200_1 may configure a processor-memory pair, and the number of the processor-memory pairs included in the first storage server 2200_1 may be changed. In an example embodiment, the number of the processors 2210_1 and the number of the memories 2220_1, included in the first storage server 2200_1 may be different from each other. The processor 2210_1 may include a single-core processor or a multi-core processor.

The switch 2230_1 may selectively connect the processor 2210_1 and the storage device 2250_1, or the NIC 2240_1 and the storage device 2250_1, according to the control of the processor 2210_1.

The NIC 2240_1 may be configured to connect the first storage server 2200_1 to a network NT. The NIC 2240_1 may include a network interface card, a network adapter, and the like. The NIC 2240_1 may be connected to the network NT by a wired interface, a wireless interface, a Bluetooth interface, an optical interface, or the like. The NIC 2240_1 may include an internal memory, a DSP, a host bus interface, and the like, and may be connected to the processor 2210_1 or the switch 2230_1 through the host bus interface. The host bus interface may include at least one of various interfaces such as an advanced technology attachment (ATA), a serial ATA (SATA), an external SATA (e-SATA), a small computer small interface (SCSI), a serial attached SCSI (SAS), a peripheral component interconnection (PCI), a PCI express (PCIe), an NVM express (NVMe), an IEEE 1394, a universal serial bus (USB), a secure digital (SD) card, a multimedia card (MMC), an embedded multi-media card (eMMC), a universal flash storage (UFS), an embedded universal flash storage (eUFS), and a compact flash (CF) card. In an example embodiment, the NIC 2240_1 may be integrated with at least one of the processor 2210_1, the switch 2230_1, or the storage device 2250_1.

The storage device 2250_1 may store data or output the stored data, under the control of the processor 2210_1. The storage device 2250_1 may include a controller 2251_1, a nonvolatile memory 2252_1, a DRAM 2253_1, and an interface 2254_1. In an example embodiment, the storage device 2250_1 may further include a secure element (SE) for security or privacy.

The controller 2251_1 may control overall operations of the storage device 2250_1. In an example embodiment, the controller 2251_1 may include an SRAM. The controller 2251_1 may store data in the nonvolatile memory 2252_1 or output the data stored in the nonvolatile memory 2252_1 in response to signals received through the interface 2254_1. In an example embodiment, the controller 2251_1 may be configured to control the nonvolatile memory 2252_1 based on a toggle interface or an ONFI interface.

The DRAM 2253_1 may be configured to temporarily store data to be stored in the nonvolatile memory 2252_1 or data read from the nonvolatile memory 2252_1. The DRAM 2253_1 may be configured to store various data (e.g., metadata, mapping data, etc.) used for the controller 2251_1 to operate. The interface 2254_1 may provide a physical connection between the processor 2210_1, the switch 2230_1, the NIC 2240_1, and the controller 2251_1. In an example embodiment, the interface 2254_1 may be implemented in a direct-attached storage (DAS) method that directly connects the storage device 2250_1 with a dedicated cable. In an example embodiment, the interface 2254_1 may be configured based on at least one of the various interfaces through the host interface bus described above.

The above-described configurations of the first storage server 2200_1 are examples. The above-described configurations of the first storage server 2200_1 may be applied to other storage servers or a plurality of application servers, respectively. In an example embodiment, in each of the plurality of application servers 2100_1 to 2100_n, the storage device 2150_1 may be selectively omitted.

The plurality of application servers 2100_1 to 2100_n and the plurality of storage servers 2200_1 to 2200_m may communicate with each other through the network NT. The network NT may be implemented by using a fiber channel (FC) or Ethernet. In this case, the FC is a medium used for relatively high-speed data transmission, and may use an optical switch that provides high performance/high availability. Depending on an access method of the network NT, the storage servers 2200_1 to 2200_m may be provided as a file storage, a block storage, or an object storage.

In an example embodiment, the network NT may be a storage-only network, such as a storage area network (SAN). For example, the SAN may be a Fiber Channel (FC) SAN (FC-SAN) that uses an FC network and is implemented according to FC protocol (FCP). In another implementation, the SAN may be an Internet Protocol (IP) SAN (IP-SAN) that uses a Transmission Control Protocol/Internet Protocol (TCP/IP) network and is implemented according to an iSCSI (SCSI over TCP/IP or Internet SCSI) protocol. In an example embodiment, the network NT may be a general network such as a TCP/IP network. For example, the network NT may be implemented according to a protocol such as FC over Ethernet (FCOE), Network Attached Storage (NAS), and NVMe over Fabrics (NVMe-oF).

In an example embodiment, at least one of the plurality of application servers 2100_1 to 2100_n may be configured to access at least another one of the plurality of application servers 2100_1 to 2100_n or at least one of the plurality of storage servers 2200_1 to 2200_m.

For example, the first application server 2100_1 may store data requested by a user or a client in at least one of the plurality of storage servers 2200_1 to 2200_m through the network NT. In another implementation, the first application server 2100_1 may obtain data requested by a user or a client from at least one of a plurality of storage servers 2200_1-2200_m through the network NT. In this case, the first application server 2100_1 may be implemented as a web server or a database management system (DBMS).

Thus, the processor 2110_1 of the first application server 2100_1 may access the memory 2120_n or the storage device 2150_n of another application server 2100_n through the network NT. In another implementation, the processor 2110_1 of the first application server 2100_1 may access the memory 2220_1 or the storage device 2250_1 of the first storage server 2200_1 through the network NT. Through this, the first application server 2100_1 may perform various operations on data stored in other application servers 2100_2 to 2100_n or the plurality of storage servers 2200_1 to 2200_m. For example, the first application server 2100_1 may execute or issue a command for moving or copying data between other application servers 2100_2 to 2100_n or the plurality of storage servers 2200_1 to 2200_m. In this case, the moved or copied data may be moved from the storage devices 2250_1 to 2250_m of the storage servers 2200_1 to 2200_m through the memories 2220_1 to 2220_m of the storage servers 2200_1 to 2200_m to the memories 2120_1 to 2120_n of the application servers 2100_1 to 2100_n, or may be directly moved therefrom to the memories 2120_1 to 2120_n of the application servers 2100_1 to 2100_n. Data transmitted through the network NT may be encrypted data for security or privacy.

In an example embodiment, the above-described storage servers 2200_1 to 2200_m or the above-described storage devices 2150_1 to 2150_n and 2250_1 to 2250_m may include the HMB controller according to the embodiment of the present disclosure. Thus, at least one of the storage servers 2200_1 to 2200_m or the storage devices 2150_1 to 2150_n and 2250_1 to 2250_m may set a security policy in each region of the host memory buffer based on the method described with reference to FIG. 1 to FIG. 15, may perform encoding/decoding operations based on the set security policy, and may change the security policy of each region when the change condition is satisfied.

In the above-described embodiments, components may be described by using terms such as 0-th, first, second, third, and the like. However, the terms such as 0-th, first, second, third, and the like are used to distinguish components from each other, but the terms such as 0-th, first, second, third, and the like do not imply an order or any form of numerical meaning.

In the above-described embodiments, components may be referred to using the term "block". The "block" may be implemented with hardware, such as an integrated circuit (IC), an application-specific IC (ASIC), a field programmable gate array (FPGA), and a complex programmable logic device (CPLD), software, such as firmware and applications driven in hardware devices, or combinations of hardware and software. In addition, the "block" may include circuits or intellectual property (IP), which are implemented with semiconductor devices in an IC.

By way of summation and review, as various electronic devices are used by many people and a large amount of data is generated, a large amount of resources may be demanded to handle data in a storage device, and a sufficient amount of memory may be demanded to process a large amount of data. However, it can be difficult to implement a storage device having sufficient resources due to various issues such as a cost, a device size, a design limitation, and the like. In this regard, it may be beneficial to utilize an already existing resource to provide sufficient resources for the storage device and, thus, the storage device may use a memory buffer allocated from a host.

As described above, example embodiments may provide a storage device and an operation method thereof that may enhance security of a host memory buffer.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of operating a storage device, comprising:
   detecting an abnormal operation of a host memory buffer (HMB) positioned in a host outside the storage device during data processing; and
   when the abnormal operation is detected, updating, by the storage device, a security policy applied when writing data to or reading data from the HMB;
   receiving allocation information of the HMB from the host;
   dividing the HMB into a plurality of regions based on the allocation information; and
   matching a respective one of a plurality of security policies to each of the plurality of regions,
   wherein the updating the security policy includes updating at least one of the plurality of security policies respectively matched to the plurality of regions,
   wherein the matching the respective one of the plurality of security policies includes one of: matching a respective key to each of the plurality of regions or matching respective security IP to each of the plurality of regions, and
   wherein the updating the at least one of the plurality of security policies respectively matched to the plurality of regions includes one of changing a key of a region of the plurality of regions in which the abnormal operation occurs, or changing a security intellectual property (IP) matched to the region of the plurality of regions in which the abnormal operation occurs.

2. The method of claim 1, wherein:
   the plurality of regions include a first region and a second region,
   the security policy includes a first security policy and a second security policy different from the first security policy, and
   the matching of the respective security policy includes matching the first security policy to the first region, and matching the second security policy to the second region.

3. The method of claim 2, wherein:
   a security requirement level of the first region is higher than a security requirement level of the second region, and
   a security level of the first security policy is higher than a security level of the second security policy.

4. The method of claim 1, wherein:
   the detecting of the abnormal operation includes detecting the abnormal operation with respect to each of the plurality of regions, and
   the abnormal operation includes at least one of:
      a case in which a key validity time has elapsed,
      a case in which a data integrity check fails, or
      a case in which abnormal HMB allocation is detected.

5. The method of claim 4, wherein the case in which the data integrity check fails includes a case in which a data error rate reaches an error rate threshold value.

6. The method of claim 4, wherein the case in which the abnormal HMB allocation is detected includes a case in which it is detected that an allocation position is changed, using log information of the HMB.

7. A method of operating a storage device, comprising:
   dividing a host memory buffer (HMB) positioned outside the storage device into a plurality of regions;
   determining a respective security level of each of the plurality of regions;
   matching a respective security policy, corresponding to the respective security level determined for each of the plurality of regions, to each of the plurality of regions; and
   when an abnormal operation is detected in at least one region of the plurality of regions updating a s purity policy of the at least one region, and
   wherein the updating of the security policy of the at least one region includes at least one of:
      changing a security intellectual property (IP) of the at least one region, or
      changing a key of the at least one region.

8. The method of claim 7, wherein the determining of the respective security level of each of the plurality of regions includes determining a respective security level of each of the plurality of regions based on information of data to be stored.

9. A storage device, comprising:
   a memory device; and
   a controller configured to store information related to the memory device in a host memory buffer (HMB) positioned in a host outside the storage device, and to manage the HMB,
   wherein the controller comprises:
      an abnormality detector configured to detect abnormal operation of the HMB during data processing,
      an HMB manager configured to update a security policy applied when writing data to or reading data from the HMB when the abnormal operation is detected, and
      a security intellectual property (IP) pool including a plurality of security IPs, and wherein the HMB manager is further configured to:
  receive allocation information of the HMB from the host,
  divide the HMB into a plurality of regions based on the allocation information,
  match a respective one of a plurality of security policies to each of the plurality of regions, and
  update at least one of the plurality of security policies respectively matched to the plurality of regions,
wherein the HMB manager is further configured to:
  match a respective one of a plurality of security IP's of the security IP pool to each of the plurality of regions, or
  match a respective one of a plurality of keys to each of the plurality of regions, and
wherein the HMB manager is further configured to:
  change a security IP of the plurality of keys matched to a region of the plurality of regions in which the abnormal operation occurs, of
  change a key of the plurality of keys matched to the region of the plurality of regions in which the abnormal operation occurs.

10. The storage device of claim 9, wherein:
the plurality of regions include a first region and a second region,
the plurality of security policies respectively matched to the plurality of regions include a first security policy and a second security policy different from the first security policy, and
the HMB manager is configured to match the first security policy to the first region and the second security policy to the second region.

11. The storage device of claim 9, wherein:
the abnormality detector is configured to detect the abnormal operation with respect to each of the plurality of regions, and
the abnormal operation includes at least one of:
  a case in which a key validity time has elapsed,
  a case in which a data integrity check fails, or
  a case in which abnormal HMB allocation is detected.

* * * * *